(12) United States Patent
Kusafuka et al.

(10) Patent No.: US 11,881,130 B2
(45) Date of Patent: Jan. 23, 2024

(54) HEAD-UP DISPLAY SYSTEM AND MOVING BODY

(71) Applicant: KYOCERA Corporation, Kyoto (JP)

(72) Inventors: Kaoru Kusafuka, Tokyo (JP); Mitsuhiro Murata, Yao (JP); Sunao Hashimoto, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/779,536

(22) PCT Filed: Nov. 17, 2020

(86) PCT No.: PCT/JP2020/042855
§ 371 (c)(1),
(2) Date: May 24, 2022

(87) PCT Pub. No.: WO2021/106689
PCT Pub. Date: Jun. 3, 2021

(65) Prior Publication Data
US 2023/0026137 A1 Jan. 26, 2023

(30) Foreign Application Priority Data
Nov. 27, 2019 (JP) ................................. 2019-214700

(51) Int. Cl.
*G09G 3/00* (2006.01)
*H04N 13/156* (2018.01)
(Continued)

(52) U.S. Cl.
CPC ......... *G09G 3/002* (2013.01); *G02B 27/0172* (2013.01); *H04N 13/133* (2018.05);
(Continued)

(58) Field of Classification Search
CPC ........... G09G 3/002; G09G 2320/0626; G09G 2330/08; G09G 2340/0492;
(Continued)

(56) References Cited

U.S. PATENT DOCUMENTS

2003/0231144 A1   12/2003   Cho et al.
2008/0259223 A1   10/2008   Read et al.
(Continued)

FOREIGN PATENT DOCUMENTS

CN   107179076 A   9/2017
CN   109891300 A   6/2019
(Continued)

*Primary Examiner* — Douglas M Wilson
(74) *Attorney, Agent, or Firm* — Procopio, Cory, Hargreaves & Savitch LLP

(57) ABSTRACT

A head-up display system includes a first projection module, a second projection module, and a first reflective optical element. The first projection module projects a first image. The second projection module projects a second image. The first reflective optical element reflects at least a part of the first image and at least a part of the second image. The first projection module includes a first display panel that displays the first image and projects the first image toward the first reflective optical element. The second projection module includes a second display panel that displays the second image, and an optical system that directs the second image toward the first reflective optical element.

25 Claims, 14 Drawing Sheets

(51) Int. Cl.
    *H04N 13/133*     (2018.01)
    *G02B 27/01*     (2006.01)
    *G02B 30/31*     (2020.01)
    *G02B 30/30*     (2020.01)
    *H04N 13/31*     (2018.01)
    *B60K 35/00*     (2006.01)
    *G02B 30/26*     (2020.01)

(52) U.S. Cl.
    CPC ........... *H04N 13/156* (2018.05); *B60K 35/00* (2013.01); *B60K 2370/1529* (2019.05); *B60K 2370/177* (2019.05); *B60K 2370/23* (2019.05); *B60K 2370/31* (2019.05); *B60K 2370/334* (2019.05); *B60K 2370/349* (2019.05); *B60K 2370/52* (2019.05); *B60R 2300/205* (2013.01); *G02B 27/01* (2013.01); *G02B 27/0101* (2013.01); *G02B 30/26* (2020.01); *G02B 30/30* (2020.01); *G02B 30/31* (2020.01); *G09G 2320/0626* (2013.01); *G09G 2330/08* (2013.01); *G09G 2340/0492* (2013.01); *G09G 2354/00* (2013.01); *H04N 13/31* (2018.05)

(58) Field of Classification Search
    CPC ........... G09G 2354/00; G02B 27/0172; G02B 27/0101; G02B 30/30; G02B 2027/0134; H04N 13/133; H04N 13/156; H04N 13/346; H04N 13/324; H04N 13/31; H04N 13/363; B60K 35/00; B60K 2370/1529; B60K 2370/23; B60K 2370/349; B60K 2370/52; B60K 2370/177; B60K 2370/25; B60K 2370/31; B60K 2370/334; B60K 2370/347; B60K 2370/35
    See application file for complete search history.

(56) References Cited

U.S. PATENT DOCUMENTS

| | | | |
|---|---|---|---|
| 2010/0073636 A1 | 3/2010 | Sasaki et al. | |
| 2013/0215001 A1* | 8/2013 | Oka | H04N 13/305 345/87 |
| 2014/0253821 A1* | 9/2014 | Takatoh | G02B 27/0101 349/11 |
| 2015/0226965 A1* | 8/2015 | Kim | G02B 30/30 359/462 |
| 2017/0097504 A1* | 4/2017 | Takamatsu | B60K 35/00 |
| 2017/0161009 A1 | 6/2017 | Ogisu et al. | |
| 2017/0262339 A1 | 9/2017 | Hoshina | |
| 2019/0025594 A1 | 1/2019 | Holmer et al. | |
| 2019/0164461 A1 | 5/2019 | Tomioka | |
| 2019/0235234 A1 | 8/2019 | Hu et al. | |
| 2019/0235240 A1* | 8/2019 | Nagano | B60K 35/00 |
| 2019/0258057 A1* | 8/2019 | Hada | G02B 27/0101 |
| 2019/0317322 A1 | 10/2019 | Hayakawa et al. | |
| 2019/0377177 A1* | 12/2019 | Takahashi | G02B 30/28 |
| 2021/0011286 A1* | 1/2021 | Morohashi | G03B 21/28 |
| 2021/0232028 A1* | 7/2021 | Sakai | B60K 35/00 |
| 2022/0283456 A1* | 9/2022 | Hada | G03B 21/006 |

FOREIGN PATENT DOCUMENTS

| | | | |
|---|---|---|---|
| EP | 3528043 A1 | 8/2019 | |
| JP | 60-192912 A | 10/1985 | |
| JP | 2001-136466 A | 5/2001 | |
| JP | 2004-29785 A | 1/2004 | |
| JP | 2007-279930 A | 10/2007 | |
| JP | 2009-8722 A | 1/2009 | |
| JP | 2010-72455 A | 4/2010 | |
| JP | 2012-29169 A | 2/2012 | |
| JP | 2015-41922 A | 3/2015 | |
| JP | 2017-62448 A | 3/2017 | |
| JP | 2018-200384 A | 12/2018 | |
| JP | 2019-59248 A | 4/2019 | |
| JP | 2019-133039 A | 8/2019 | |
| JP | 2019-142276 A | 8/2019 | |
| WO | 2013/058123 A1 | 4/2013 | |
| WO | 2016/052186 A1 | 4/2016 | |
| WO | 2018/025475 A1 | 2/2018 | |
| WO | 2018/142806 A1 | 8/2018 | |
| WO | WO-2018139611 A1 * | 8/2018 | ............ B60K 35/00 |
| WO | 2019/156030 A1 | 8/2019 | |
| WO | 2019/160160 A1 | 8/2019 | |

\* cited by examiner

HEAD-UP DISPLAY SYSTEM AND MOVING BODY

FIELD

The present disclosure relates to a head-up display system and a movable body.

BACKGROUND

A known technique is described in, for example, Patent Literature 1.

CITATION LIST

Patent Literature

Patent Literature 1: Japanese Unexamined Patent Application Publication No. 2009-008722

BRIEF SUMMARY

A head-up display system according to one embodiment of the present disclosure includes a first projection module, a second projection module, and a first reflective optical element. The first projection module projects a first image. The second projection module projects a second image. The first reflective optical element reflects at least a part of the first image and at least a part of the second image. The first projection module includes a first display panel that displays the first image and projects the first image toward the first reflective optical element. The second projection module includes a second display panel that displays the second image, and an optical system that directs the second image toward the first reflective optical element.

A movable body according to one embodiment of the present disclosure includes a head-up display system. The head-up display system includes a first projection module, a second projection module, and a first reflective optical element. The first projection module projects a first image. The second projection module projects a second image. The first reflective optical element reflects at least a part of the first image and at least a part of the second image. The first projection module includes a first display panel that displays the first image and projects the first image toward the first reflective optical element. The second projection module includes a second display panel that displays the second image, and an optical system that directs the second image toward the first reflective optical element.

BRIEF DESCRIPTION OF DRAWINGS

The objects, features, and advantages of the present disclosure will become more apparent from the following detailed description and the drawings.

DETAILED DESCRIPTION

As a head-up display (HUD) system with the structure that forms the basis of a HUD system according to one or more embodiments of the present disclosure, a known HUD system causes images having parallax between them to reach the left and right eyes of a user and projects a virtual image in the field of view of the user to be viewed as a three-dimensional (3D) image with depth.

The HUD system may have, in the field of view of the user, a limited range in which an image can be displayed depending on, for example, the positions of the user's eyes or the position and the size of the display panel from which the image is projected. The HUD system is to have a wider range for displaying an image.

In response to the above issue, one or more aspects of the present disclosure are directed to a HUD system and a movable body with an extended range for displaying an image in the field of view of the user.

One or more embodiments of the present disclosure will now be described with reference to the drawings. The drawings used herein are schematic and are not drawn to scale relative to the actual size of each component.

Head-Up Display System

Figure 1:
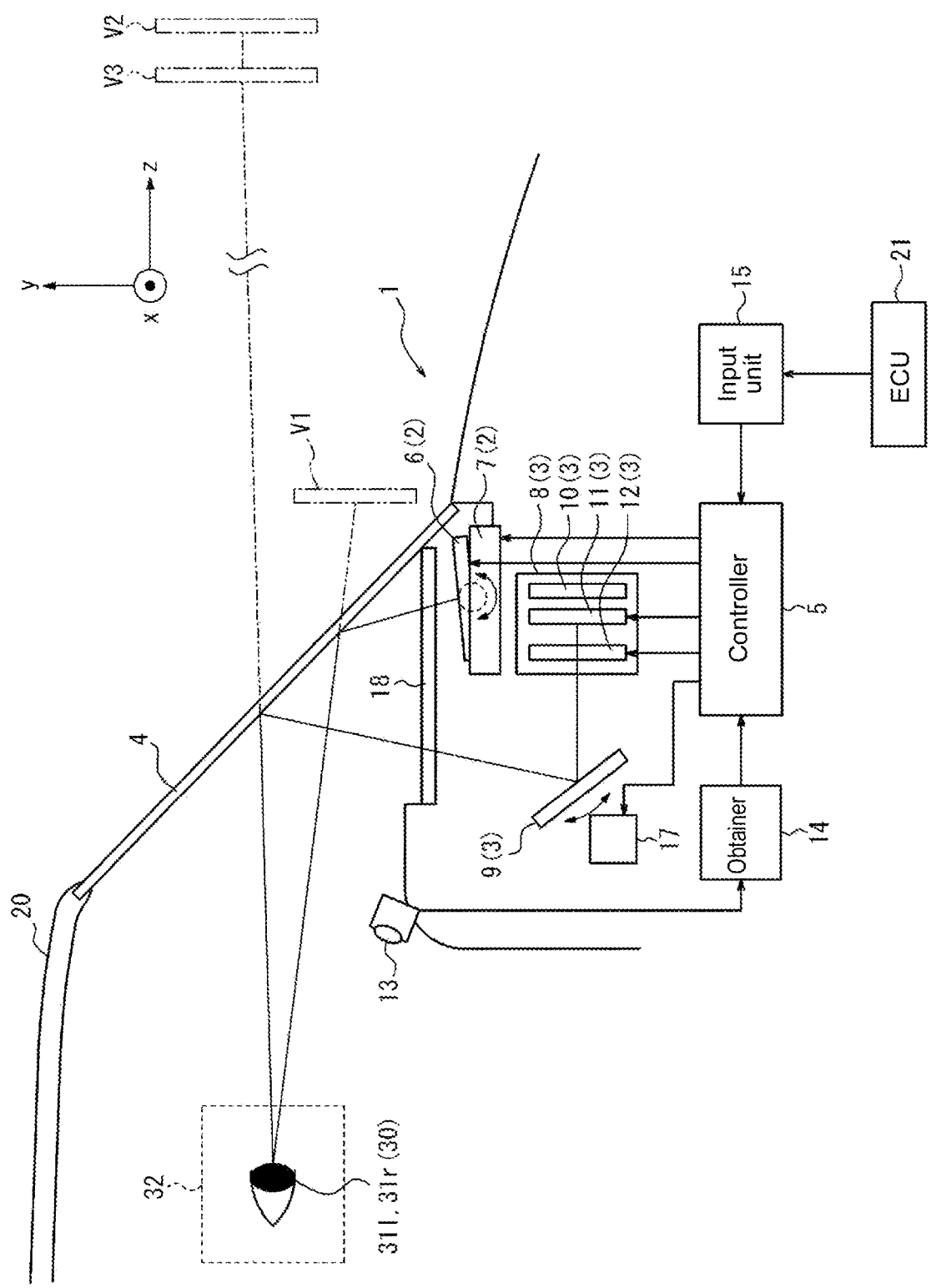
FIG. 1 is a schematic diagram of an example head-up display (HUD) system mounted on a movable body.

As shown in FIG. 1, a head-up display system 1 according to an embodiment of the present disclosure includes a first projection module 2, a second projection module 3, a first reflective optical element 4, and a controller 5. The head-up display system 1 is hereafter also referred to as a HUD system 1. The HUD system 1 may be mounted on a movable body 20. The HUD system 1 mounted on the movable body 20 displays an image for a user 30 aboard the movable body 20. An image projected by the first projection module 2 is referred to as a first image. An image projected by the second projection module 3 is referred to as a second image.

FIG. 1 shows the HUD system 1 mounted on the movable body 20. In FIG. 1, x-direction refers to an interocular direction of the user 30, or the direction along a line passing through a left eye 31*l* and a right eye 31*r* of the user 30, z-direction refers to the front-rear direction as viewed from the user 30, and y-direction refers to the height direction orthogonal to x-direction and z-direction.

The movable body according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above examples. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

First Projection Module

The first projection module 2 includes a first display panel 6. The first display panel 6 displays an image. The first display panel 6 may include a flat display panel selected from a liquid crystal display (LCD), an organic electroluminescent (EL) display, an inorganic EL display, a plasma display panel (PDP), a field-emission display (FED), an electrophoresis display, and a twisting-ball display.

In one of multiple embodiments, the first display panel 6 emits image light linearly toward the first reflective optical element 4 as shown in FIG. 1. The image light reflected by the first reflective optical element 4 reaches the left eye 31l and the right eye 31r of the user 30. This causes the user 30 to view a first virtual image V1 of the first display panel 6 reflected by the first reflective optical element 4.

The first projection module 2 may further include a stage 7 on which the first display panel 6 is mountable. The stage 7 can move or orient the first display panel 6 with respect to the first reflective optical element 4. This causes the first projection module 2 to change the position at which the first image is projected on the first reflective optical element 4.

Figure 2:
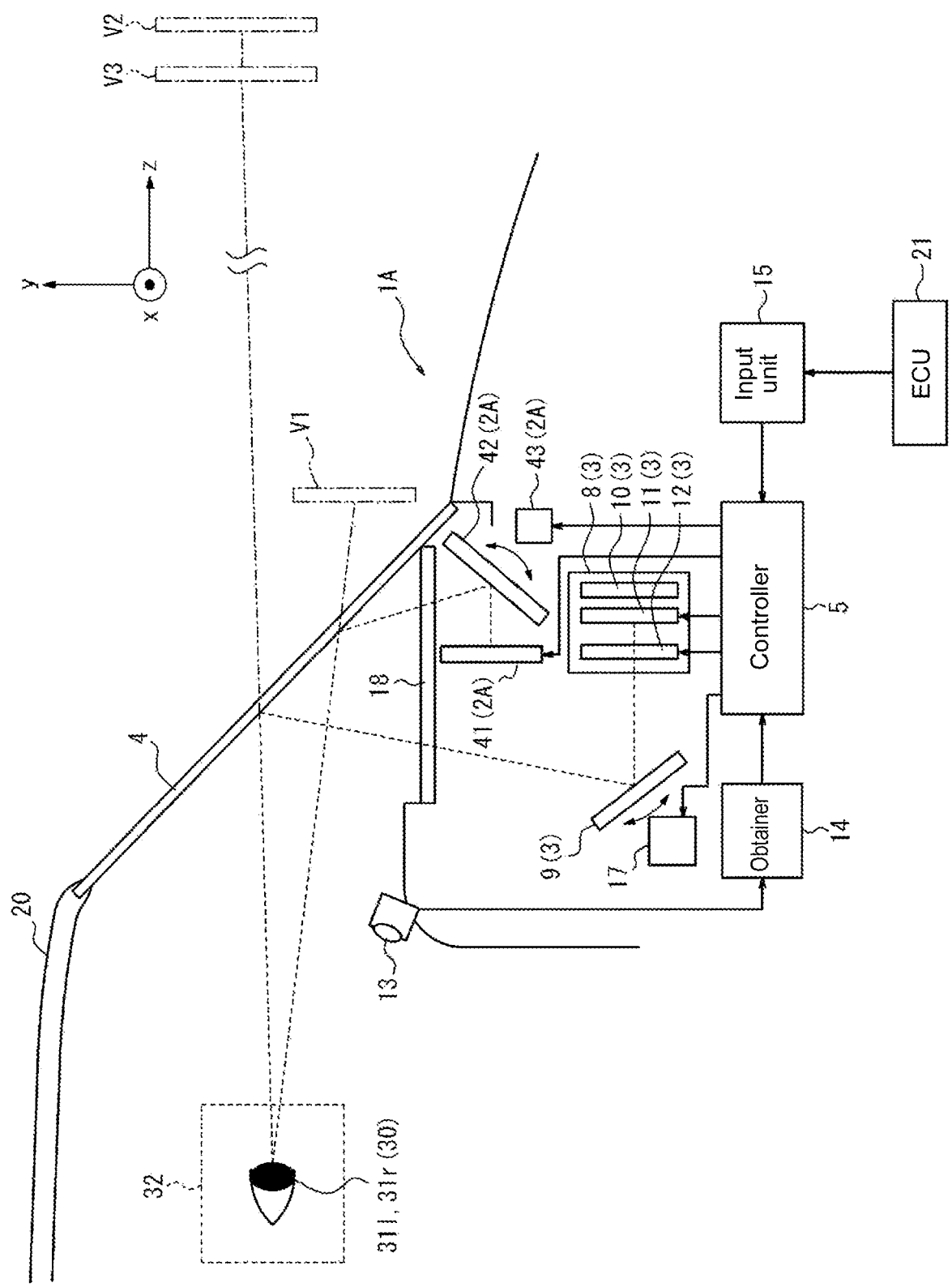
FIG. 2 is a schematic diagram of another example HUD system mounted on a movable body.

In some embodiments, as shown in FIG. 2, a first display panel 41 in a first projection module 2A may project image light toward the first reflective optical element 4 through a second reflective optical element 42. The second reflective optical element 42 reflects light for the first image emitted from the first display panel 41 toward the first reflective optical element 4. The second reflective optical element 42 may be a mirror with a flat reflective surface. The second reflective optical element 42 may be a concave mirror or a convex mirror, instead of a mirror with a flat reflective surface. The structure including the second reflective optical element 42 allows the first display panel 41 to be installed at a position not directly viewable to the user 30.

The second reflective optical element 42 may change the position at which the first image is projected on the first reflective optical element 4. Thus, the first projection module 2A may further include a mirror drive 43 for changing the orientation or the position of the second reflective optical element 42. The mirror drive 43 may be controlled by the controller 5. The mirror drive 43 may include, for example, a stepper motor.

Second Projection Module

The second projection module 3 includes a display device 8 and an optical system 9.

The display device 8 includes an illuminator 10 and a second display panel 11. The display device 8 emits image light from the second image displayed on the second display panel 11. For the second projection module 3 that can project a parallax image viewable as a 3D image to the user 30, the display device 8 may further include a parallax optical element 12. For the second projection module 3 that projects an image viewable as a two-dimensional (2D) image alone to the user 30, the parallax optical element 12 may be eliminated. The structure including the second projection module 3 that can display a parallax image will be described in detail later.

The optical system 9 causes image light from the second image emitted by the display device 8 to travel toward the first reflective optical element 4. The optical system 9 may have a predetermined positive refractive index. The optical system 9 with a predetermined positive refractive index causes the second image on the second display panel 11 to be projected as an enlarged virtual image at a position farther than the first reflective optical element 4 in the field of view of the user 30. The optical system 9 may include a mirror. The mirror included in the optical system 9 may be a concave mirror.

The structure of the second projection module 3 that can display a parallax image will now be described.

The illuminator 10 illuminates the second display panel 11 with planar illumination light. The illuminator 10 may include a light source, a light guide plate, a diffuser plate, and a diffuser sheet. The illuminator 10 spreads illumination light emitted from its light source uniformly to illuminate the surface of the second display panel 11. The illuminator 10 can emit illumination light to be substantially uniform through, for example, the light guide plate, the diffuser plate, and the diffuser sheet. The illuminator 10 may emit the uniform light toward the second display panel 11.

The second display panel 11 may be, for example, a transmissive liquid crystal display panel. The second display panel 11 is not limited to a transmissive liquid crystal panel but may be a self-luminous display panel. The self-luminous display panel may be, for example, an organic EL display or an inorganic EL display. For the second display panel 11 being a self-luminous display panel, the display device 8 may not include the illuminator 10.

Figure 3:
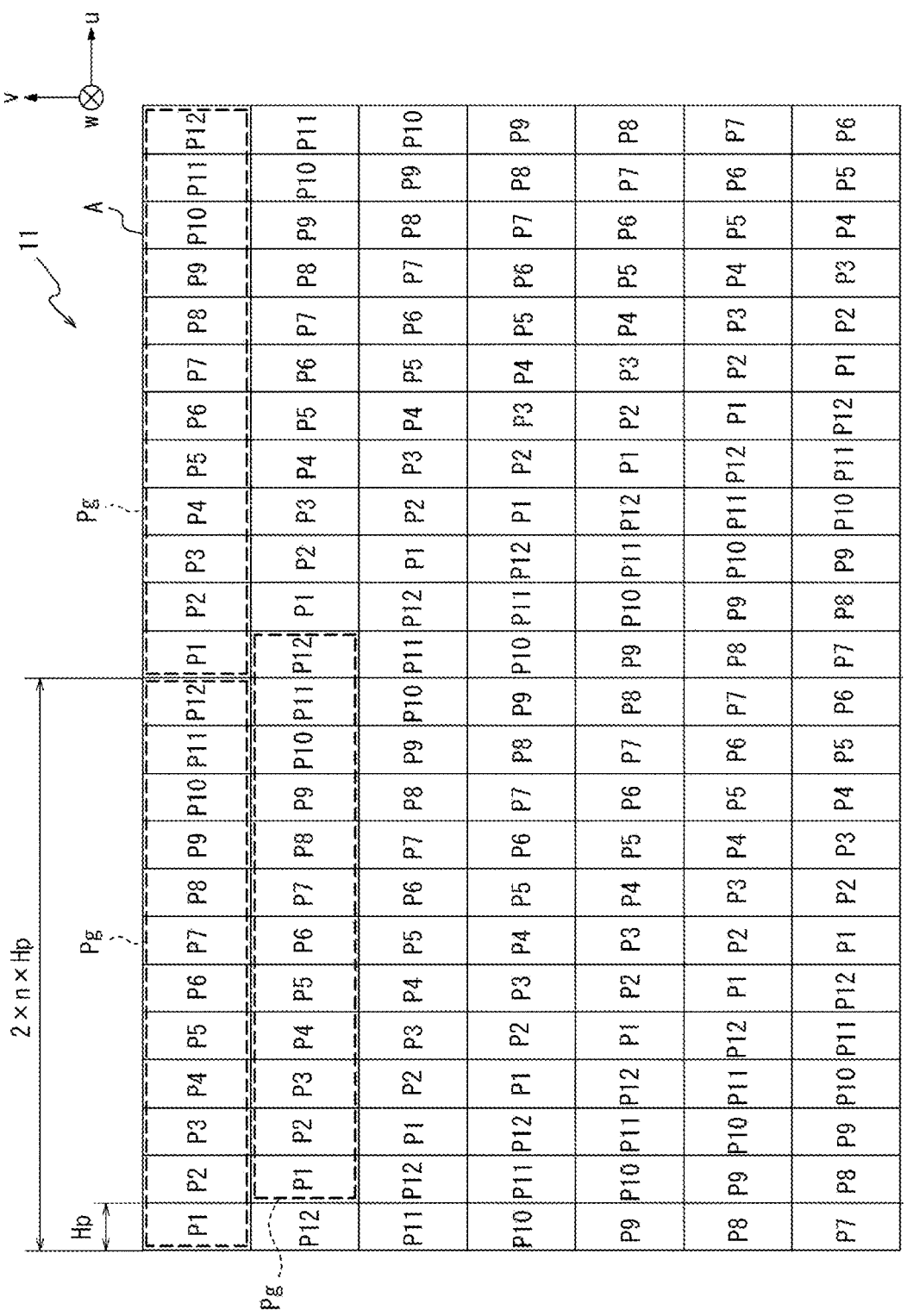
FIG. 3 is a diagram of an example display panel shown in FIG. 1 viewed in a depth direction.

As shown in FIG. 3, the second display panel 11 includes a planar active area A including multiple divisional areas. The active area A can display a parallax image. The parallax image includes a left eye image and a right eye image (described later). The right eye image has parallax with respect to the left eye image. In FIG. 3, the divisional areas are defined in u-direction and in v-direction orthogonal to u-direction. The direction orthogonal to u-direction and v-direction is referred to as w-direction. The u-direction may be referred to as a horizontal direction. The v-direction may be referred to as a vertical direction. The w-direction may be referred to as a depth direction. The u-direction is the direction corresponding to the parallax direction of the user 30.

Each divisional area corresponds to a subpixel. Thus, the active area A includes multiple subpixels arranged in a lattice in u-direction and v-direction. Each subpixel has one of the colors red (R), green (G), and blue (B). One pixel may be a set of three subpixels with R, G, and B. One pixel may include four or any other number of subpixels, instead of three subpixels. One pixel may include subpixels with a combination of colors different from R, G, and B. A pixel may be referred to as a picture element. For example, multiple subpixels included in one pixel may be arranged in the horizontal direction. Multiple subpixels having the same color may be arranged, for example, in the vertical direction.

The multiple subpixels arranged in the active area A form subpixel groups Pg under control by the controller 5. Multiple subpixel groups Pg are arranged repeatedly in u-direction. Each subpixel group Pg may be aligned with or shifted from the corresponding subpixel group Pg in v-direction. For example, the subpixel groups Pg are repeatedly arranged in v-direction at positions shifted by one subpixel in u-direction from the corresponding subpixel group Pg in adjacent rows. The subpixel groups Pg each include multiple subpixels in predetermined rows and columns. More specifically, the multiple subpixel groups Pg each include (2×n×b) subpixels P1 to PN (N=2×n×b), which are consecutively arranged in b rows in v-direction and in (2×n) columns in u-direction. In the example shown in FIG. 3, n is 6, and b is 1. The active area A shown in FIG. 3 includes the subpixel groups Pg each including 12 subpixels P1 to P12 consecutively arranged in one row in v-direction and in 12 columns in u-direction. In the example shown in FIG. 3, some of the subpixel groups Pg are denoted by reference signs.

Each subpixel group Pg is the smallest unit controllable by the controller 5 to display an image. The subpixels included in each subpixel group Pg are identified using identification reference signs P1 to PN (N=2×n×b). The subpixels P1 to PN (N=2×n×b) included in each subpixel group Pg with the same identification reference signs are controlled by the controller 5 at the same time. Being controlled at the same time includes being controlled simultaneously and substantially simultaneously. Being controlled at the same time includes being controlled based on the same single clock and in the same frame. For example, the controller 5 can switch the image to be displayed by the subpixels P1 from the left eye image to the right eye image at the same time in all the subpixel groups Pg.

As shown in FIG. 1, the parallax optical element 12 extends along the second display panel 11. The parallax optical element 12 is separate from the active area A in the second display panel 11 by a gap g, or a distance. The parallax optical element 12 may be located opposite to the illuminator 10 from the second display panel 11. The parallax optical element 12 may be located between the second display panel 11 and the illuminator 10.

Figure 4:
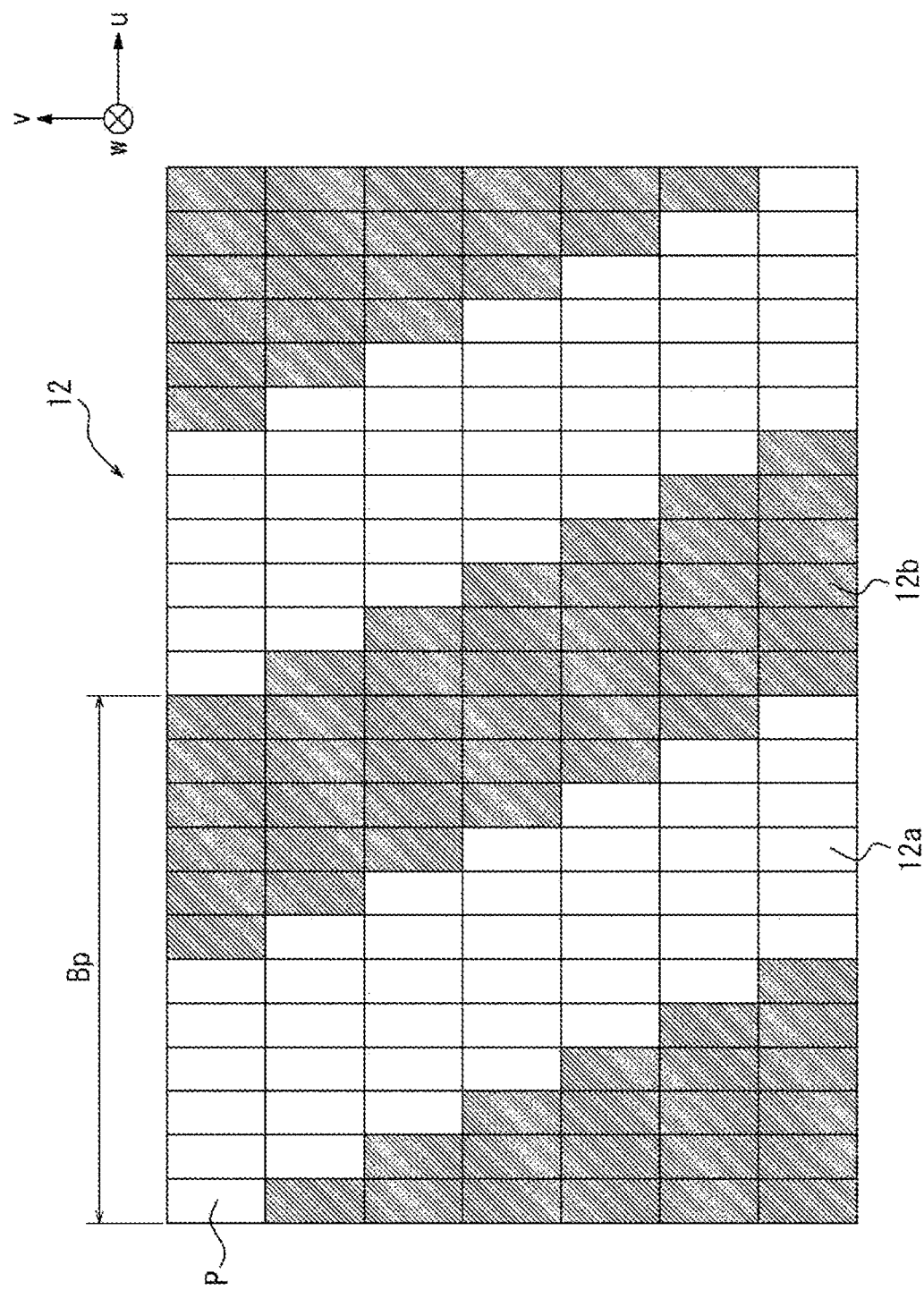
FIG. 4 is a diagram of an example parallax optical element shown in FIG. 1 viewed in the depth direction.

The parallax optical element 12 can define the traveling direction of image light emitted from the multiple subpixels. The parallax optical element 12 can substantially define a viewing zone 32 for a parallax image. The viewing zone 32 is the range of space from which the left eye 31l and the right eye 31r of the user 30 can view the parallax image as a 3D image. In one example, the parallax optical element 12 is a liquid crystal shutter as shown in FIG. 4. Similarly to the second display panel 11, the liquid crystal shutter includes multiple pixels P. The parallax optical element 12 being a liquid crystal shutter can control the light transmittance of each pixel P. Each pixel P in the parallax optical element 12 can switch between a high light-transmittance state and a low light-transmittance state. A pixel P with a higher light transmittance may be hereafter referred to as an open pixel. The multiple pixels P included in the parallax optical element 12 may correspond to the multiple subpixels included in the second display panel 11. The multiple pixels P in the parallax optical element 12 differ from the subpixels in the second display panel 11 in that the pixels P have no color components.

The parallax optical element 12 includes multiple transmissive portions 12a and multiple light-reducing portions 12b as controlled by the controller 5. For the parallax optical element 12 being a liquid crystal shutter, the transmissive portions 12a include pixels P with a higher light transmittance, and the light-reducing portions 12b include pixels P with a lower light transmittance. The light-reducing portions 12b are strip areas extending in a predetermined direction in the plane of the parallax optical element 12. The light-reducing portions 12b define transmissive portions 12a between adjacent light-reducing portions 12b. The transmissive portions 12a and the light-reducing portions 12b extend in a predetermined direction along the active area A. The transmissive portions 12a and the light-reducing portions 12b are arranged alternately in a direction orthogonal to the predetermined direction. The transmissive portions 12a have a higher light transmittance than the light-reducing portions 12b. The transmissive portions 12a may have a light transmittance 10 or more times, or 100 or more times, or 1000 or more times the light transmittance of the light-reducing portions 12b. The light-reducing portions 11b have a lower light transmittance than the transmissive portions 12a. The light-reducing portions 12b may block image light.

The direction in which the transmissive portions 12a and the light-reducing portions 12b extend may correspond to the direction in which the subpixel groups Pg in the second display panel 11 are arranged. The parallax optical element 12 is controlled to simultaneously cause subpixels in the subpixel groups Pg identified with the same identification reference signs P1 to P12 to be light-transmissive or light-reducing as viewed with the left eye 31l and the right eye 31r of the user 30.

Figure 5:
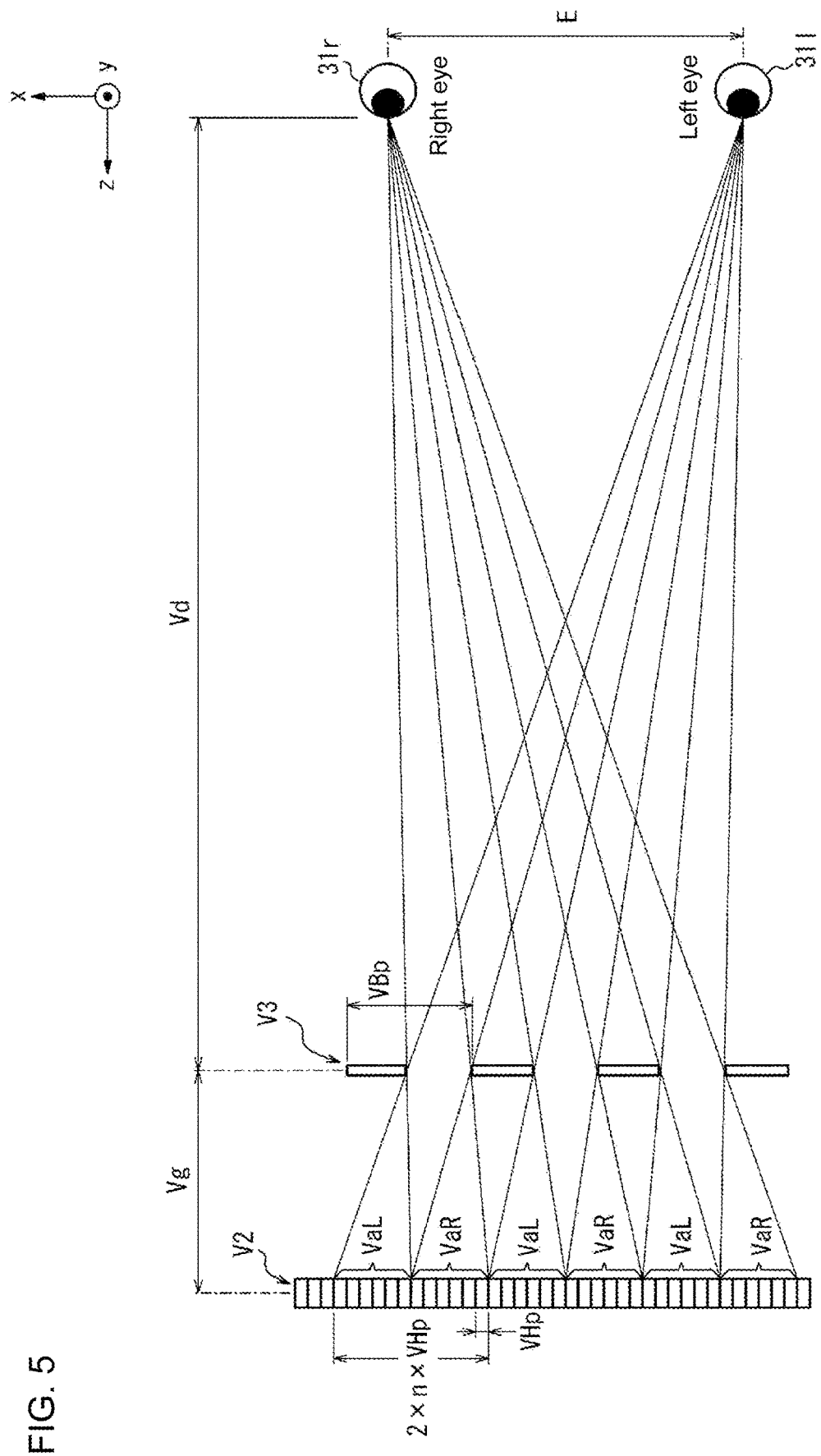
FIG. 5 is a diagram describing the relationship between a virtual image and a user's eyes shown in FIG. 1.

Image light from the second image emitted from the active area A on the second display panel 11 partially transmits through the transmissive portions 12a and reaches the first reflective optical element 4 through the optical system 9. The image light reaching the first reflective optical element 4 is reflected by the first reflective optical element 4 and reaches the left eye 31l and the right eye 31r of the user 30. This allows the left eye 31l and the right eye 31r of the user 30 to view, as a virtual image of an image appearing on the active area A, a second virtual image V2 frontward from the first reflective optical element 4. Being frontward herein refers to z-direction. As shown in FIG. 5, the user 30 perceives an image including a third virtual image V3 that is a virtual image of the parallax optical element 12 appearing to define the direction of image light from the second virtual image V2.

The user 30 thus views the image appearing as the second virtual image V2 through the third virtual image V3. In reality, the user 30 does not view the third virtual image V3, or a virtual image of the parallax optical element 12. However, the third virtual image V3 is hereafter referred to as appearing at the position at which the virtual image of the parallax optical element 12 is formed and as defining the traveling direction of image light from the second virtual image V2. Areas in the second virtual image V2 viewable by the user 30 with image light reaching the position of the left eye 31l of the user 30 are hereafter referred to as left viewable areas VaL. Areas in the second virtual image V2 viewable by the user 30 with image light reaching the position of the right eye 31r of the user 30 are referred to as right viewable areas VaR.

As shown in FIG. 5, a virtual image barrier pitch VBp and a virtual image gap Vg are determined to satisfy Formula 1 and Formula 2 below using an optimum viewing distance Vd.

$$E: Vd = (n \times VHp) : Vg \qquad (1)$$

$$Vd : VBp = (Vdv + Vg) : (2 \times n \times VHp) \qquad (2))$$

The virtual image barrier pitch VBp is the interval in x-direction at which the light-reducing portions 12b projected as the third virtual image V3 are arranged in a direction corresponding to u-direction. The virtual image gap Vg is the distance between the third virtual image V3 and the second virtual image V2. The optimum viewing distance Vd is the distance between the position of the left eye 31l or the right eye 31r of the user 30 and the third virtual image V3, or a virtual image of the parallax optical element 12. An interocular distance E is the distance between the left eye 31l and the right eye 31r. The interocular distance E may be, for example, 61.1 to 64.4 mm, as calculated through studies conducted by the National Institute of Advanced Industrial Science and Technology. VHp is the horizontal length of each subpixel of the virtual image. VHp is the length of each subpixel of the second virtual image V2 in a direction corresponding to x-direction.

As described above, the left viewable areas VaL in FIG. 5 are defined on the second virtual image V2 and viewable by the left eye 31l of the user 30 when image light transmitted through the transmissive portions 12a of the parallax optical element 12 reaches the left eye 31l of the user 30. As described above, the right viewable areas VaR are defined on the second virtual image V2 and viewable by the right eye 31r of the user 30 when image light transmitted through the transmissive portions 12a of the parallax optical element 12 reaches the right eye 31r of the user 30.

Figure 6:
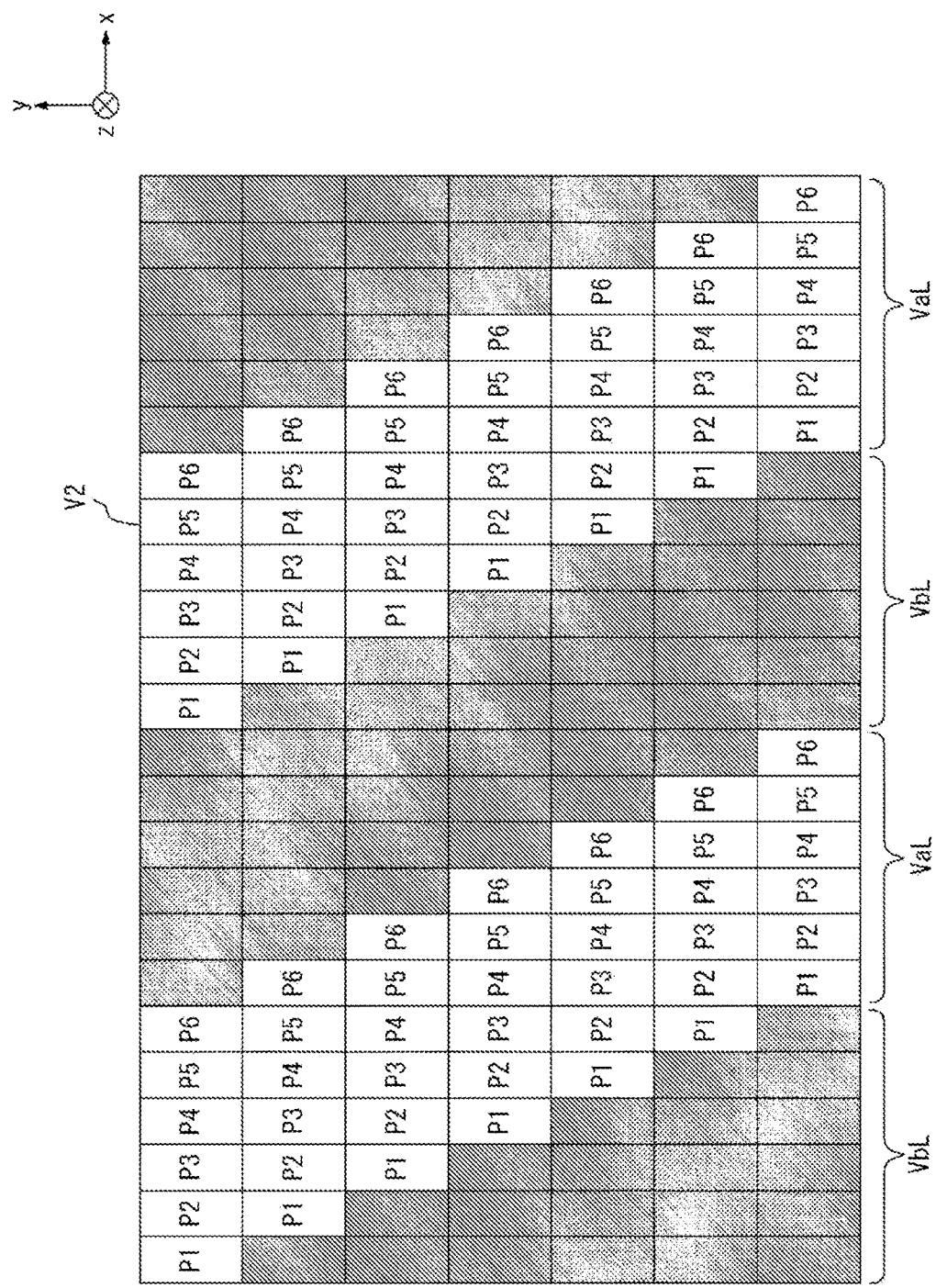
FIG. 6 is a diagram showing an area viewable with a left eye in the virtual image for the display panel.

FIG. 6 shows an example array of subpixels of the second virtual image V2 as viewed with the left eye 31l of the user 30 using the parallax optical element 12 with an aperture ratio of 50%. The subpixels on the second virtual image V2 are denoted by the same identification reference signs P1 to P12 as the subpixels shown in FIG. 3. The parallax optical element 12 with an aperture ratio of 50% includes the transmissive portions 12a and the light-reducing portions 12b each having the same width in the interocular direction (x-direction). The second virtual image V2 includes left light-reducing areas VbL with light reduced by the third virtual image V3. The left light-reducing areas VbL are less easily viewable with the left eye 31l of the user 30 when the image light is reduced by the light-reducing portions 12b on the parallax optical element 12.

Figure 7:
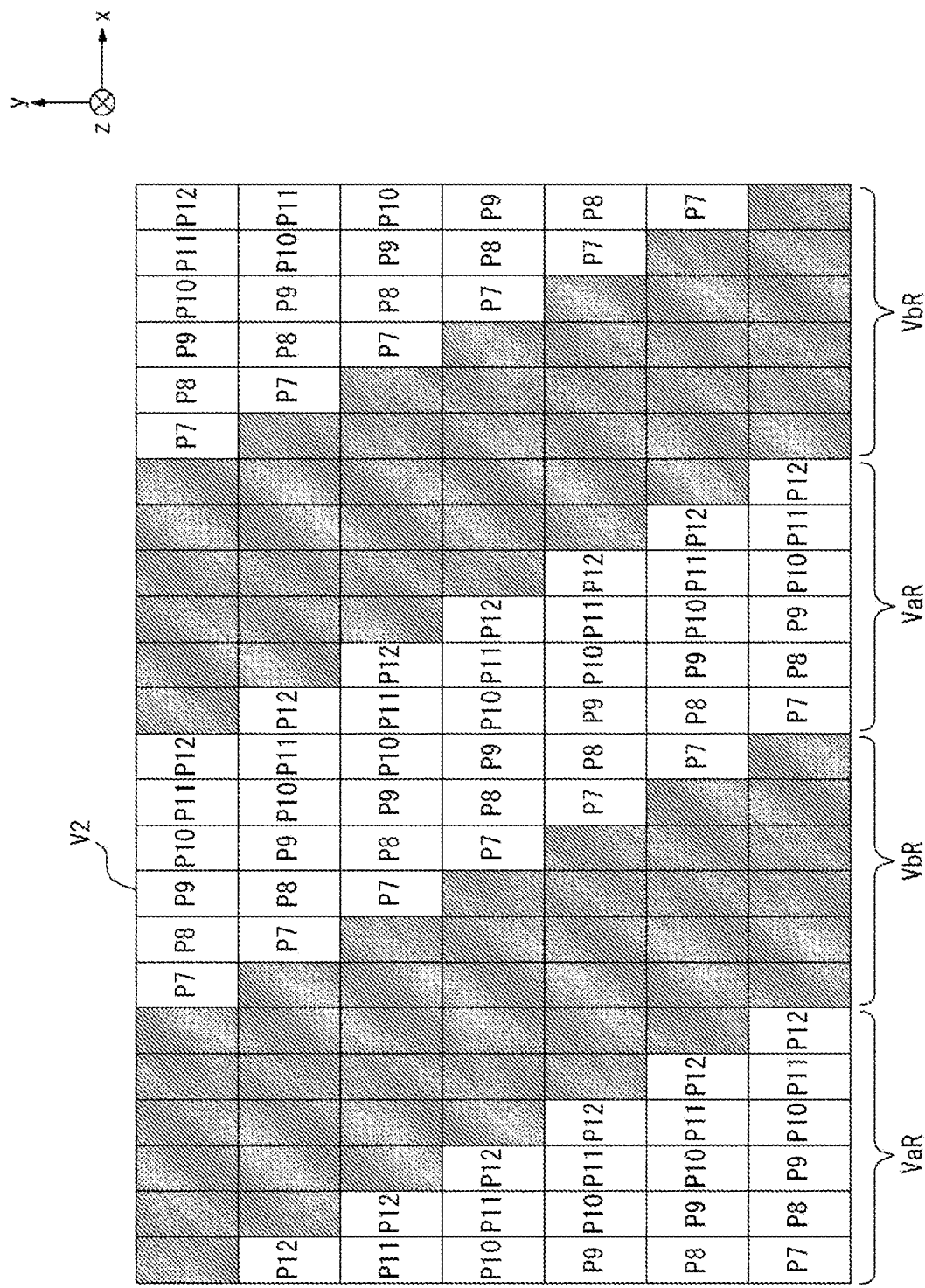
FIG. 7 is a diagram showing an area viewable with a right eye in the virtual image for the display panel.

FIG. 7 shows an example array of subpixels of the second virtual image V2 viewed with the right eye 31r of the user 30 when the left viewable areas VaL and the left light-reducing areas VbL located as shown in FIG. 6 are viewed with the left eye 31l of the user 30. The second virtual image V2 includes right light-reducing areas VbR with light reduced by the third virtual image V3. The right light-reducing areas VbR are less easily viewable with the right eye 31r of the user 30 when the image light is reduced by the light-reducing portions 12b on the parallax optical element 12.

With the parallax optical element 12 having an aperture ratio of 50%, the left viewable areas VaL may match the right light-reducing areas VbR, and the right viewable areas VaR may match the left light-reducing areas VbL. With the parallax optical element 12 having an aperture ratio of less than 50%, the left viewable areas VaL may be included in the right light-reducing areas VbR, and the right viewable areas VaR may be included in the left light-reducing areas VbL. Thus, the right viewable areas VaR are not easily viewable with the left eye 31l, and the left viewable areas VaL are not easily viewable with the right eye 31r.

In the example shown in FIGS. 6 and 7, each left viewable area VaL includes the virtual image of each of the subpixels P1 to P6 arranged in the active area A. The virtual image of the subpixels P7 to P12 arranged in the active area A is less easily viewable with the left eye 31l of the user 30. Each right viewable area VaR includes the virtual image of each of the subpixels P7 to P12 arranged in the active area A. The virtual image of the subpixels P1 to P6 arranged in the active area A is less easily viewable with the right eye 31r of the user 30. The controller 5 can cause the subpixels P1 to P6 to display the left eye image. The controller 5 can cause the subpixels P7 to P12 to display the right eye image. This allows the left eye 31l of the user 30 to view the virtual image of the left eye image on the left viewable areas VaL and allows the right eye 31r of the user 30 to view the virtual image of the right eye image on the right viewable areas VaR. As described above, the right eye image and the left eye image are parallax images having parallax between them. The user 30 can thus view the right eye image and the left eye image as a 3D image.

A change in the positions of the eyes 31 of the user 30 changes the parts of the subpixels P1 to P12 used to display the virtual image viewable with the left eye 31l and the right eye 31r of the user 30. The HUD system 1 may further include a detector 13 for detecting the positions of the left eye 31l and the right eye 31r of the user 30. The detector 13 outputs the detected positions of the left eye 31l and the right eye 31r of the user 30 to the controller 5. The detector 13 may include an imaging device or a sensor. For the HUD system 1 mounted on the movable body 20 being a vehicle, the detector 13 may be installed in any of various places such as on a rearview mirror, an instrument panel, a steering wheel, or a dashboard.

For the detector 13 including an imaging device, the imaging device captures a subject and generates an image of the subject. The imaging device includes an image sensor. The image sensor may include, for example, a charge-coupled device (CCD) image sensor or a complementary metal-oxide-semiconductor (CMOS) image sensor. The imaging device is arranged to have the face of the user 30 being at the position of the subject. For example, the detector 13 may define a predetermined position as the origin and detect the direction and amount of displacements of the eyes 31 from the origin. The detector 13 may detect, with two or more imaging devices, the position of at least one of the left eye 31l and the right eye 31r as the coordinates in a 3D space.

The detector 13 may include no imaging device and may be connected to an external imaging device. The detector 13 may include an input terminal for receiving signals from the external imaging device. The external imaging device may be directly connected to the input terminal. The external imaging device may be connected to the input terminal indirectly through a shared network.

For the detector 13 including a sensor, the sensor may be an ultrasonic sensor or an optical sensor.

The controller 5 may obtain positional information about the left eye 31l and the right eye 31r of the user 30 from the detector 13 through an obtainer 14. The obtainer 14 can obtain positional information about the left eye 31l and the right eye 31r of the user 30 detected by the detector 13. The detector 13 and the obtainer 14 are connected to each other through wired or wireless communication or both. For the movable body 20 being a vehicle, the detector 13 and the obtainer 14 may be connected to each other with a vehicle network such as a controller area network (CAN). The obtainer 14 may include a connector for wired communication, such as an electrical connector or an optical connector. The obtainer 14 may include an antenna for wireless communication.

The controller 5 controls, based on the position of the left eye 31l of the user 30, the parallax optical element 12 to allow the subpixels P1 to P6 displaying the left eye image to be viewed by the left eye 31l. The controller 5 controls, based on the position of the right eye 31r of the user 30, the parallax optical element 12 to allow the subpixels P7 to P12 displaying the right eye image to be viewed by the right eye 31r.

Figure 8:
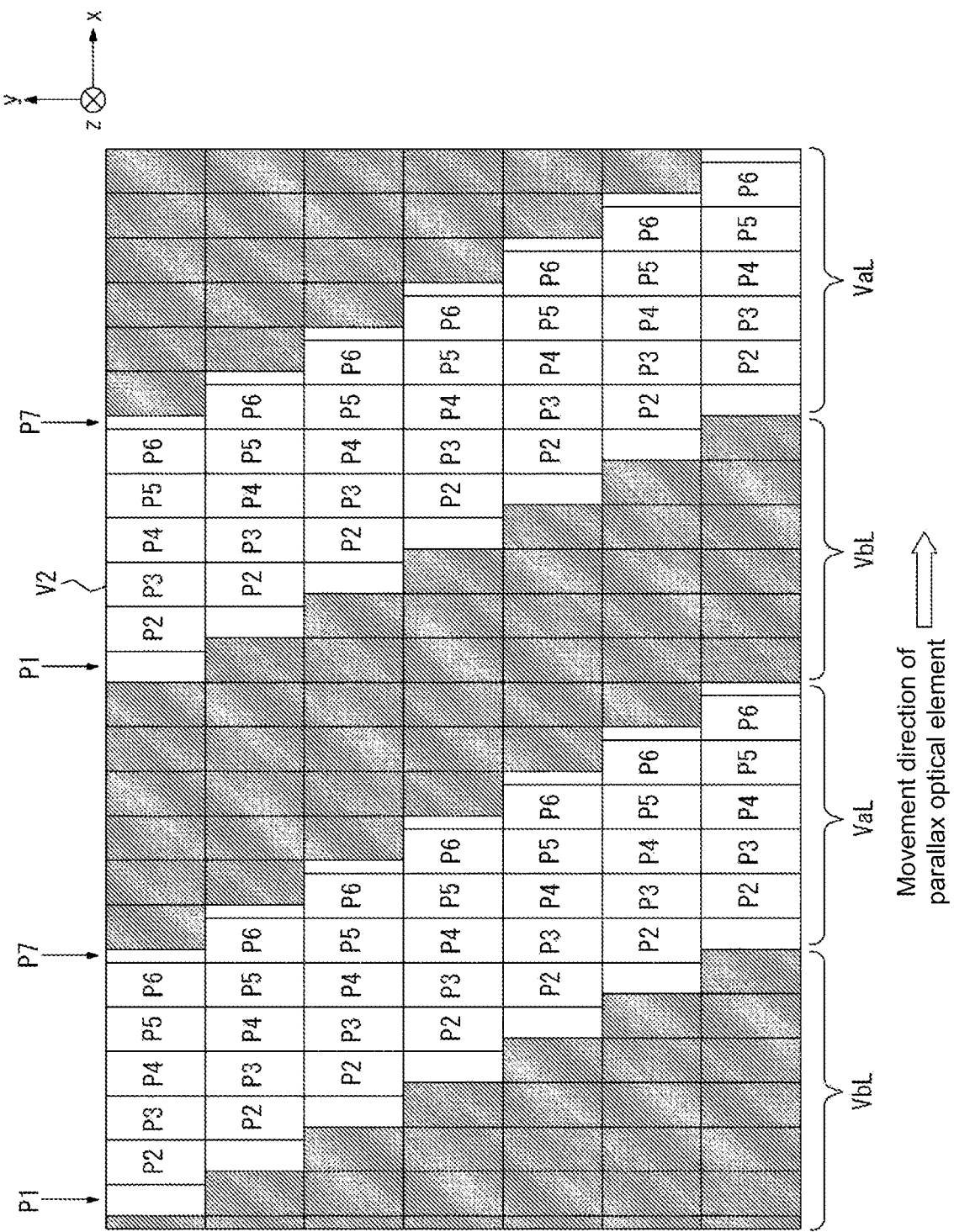
FIG. 8 is a diagram describing switching of the parallax optical element in response to a change in the positions of the user's eyes.

For example, the left eye 31l and the right eye 31r of the user 30 observing the second virtual image V2 as shown in FIGS. 6 and 7 may move relatively to the left. This causes the third virtual image V3 that is a virtual image of the parallax optical element 12 to appear to move to the right. FIG. 8 shows the second virtual image V2 when the left eye 31l of the user 30 has moved to the left from the state shown in FIG. 6. As the left eye 31l of the user 30 moves to the left, the left viewable areas VaL and the left light-reducing areas VbL move to the right.

In the example shown in FIG. 8, each left viewable area VaL includes the full area of each of the subpixels P2 to P6 and a part of each of the subpixels P1 and P7. Each right viewable area VaR includes the full area of each of the subpixels P8 to P12 and a part of each of the subpixels P7 and P1. The controller 5 controls the parallax optical element 12 to cause each left viewable area VaL to include a maximum area of each of the subpixels P1 to P6 displaying the left eye image. For example, in response to the left eye 31l of the user 30 moving further to the left from the state shown in FIG. 8, causing each left viewable area VaL to include a larger area of each subpixel P7 than the area of each subpixel P1, the controller 5 may switch open pixels P in the parallax optical element 12. In this case, the controller 5 switches, to open pixels, pixels with a lower light transmittance in the parallax optical element 12 for which virtual images are located adjacent to the left of the left viewable areas VaL. The controller 5 switches, to pixels with a lower light transmittance, open pixels in the parallax optical element 12 for which virtual images are located adjacent to the left of the left viewable areas VaL. The controller 5 switches open pixels P to maintain the subpixels P1 to P6 displaying the left eye image to be most easily viewable by the left eye 31 l of the user 30. The controller 5 controls the parallax optical element 12 for the right eye 31r in the same manner.

In some embodiments, the parallax optical element 12 may have an aperture ratio of less than 50%. When, for example, one subpixel group Pg in the active area A includes 12 subpixels P1 to P12 as in FIG. 3, the controller 5 may control one subpixel group Pg to constantly include five subpixels with a higher light transmittance. For the positional relationship between the subpixels in the second virtual image V2, the left viewable areas VaL, and the left light-reducing areas VbL viewed from the user 30 shown in FIG. 8, the controller 5 may add another pixel P with a lower light transmittance to the left of each left light-reducing area VbL to reduce image light from the subpixel P7.

In one of multiple embodiments, the second projection module 3 may be switchable, for the user, between a first state for displaying a 3D image and a second state for displaying a 2D image in the manner described above. In the first state, the controller 5 displays a parallax image on the second display panel 11 and displays, on the parallax optical element 12, the transmissive portions 12a and the light-reducing portions 12b for defining the traveling direction of image light. In the second state, the controller 5 displays a 2D image representing a 2D image on the second display panel 11 and causes the parallax optical element 12 to be entirely in a light transmission state to transmit image light uniformly. The controller 5 performs control to synchronize the switching of the states of the second display panel 11 and the parallax optical element 12. This allows the second projection module 3 to select either a 2D image or a 3D image as appropriate and display the image for the user 30.

The second projection module 3 may further include an input unit 15 that obtains external information. For the HUD system 1 mounted on the movable body 20, the input unit 15 can obtain information from an electronic control unit (ECU) 21 in the movable body 20. The ECU 21 is a computer that electronically controls various devices mounted on the movable body 20. The ECU 21 may include a navigation system or a system for controlling the inter-vehicle distance.

The second projection module 3 may further change at least either the position or the orientation of at least one component included in the optical system 9. The second projection module 3 may include a drive 17 for changing the position or the orientation of at least one component included in the optical system 9. The drive 17 may include, for example, a stepper motor. For example, the drive 17 can change the tilt of the mirror included in the optical system 9. The controller 5 may control the drive 17. The drive 17 drives the second projection module 3 to change the position at which the second image is projected on the first reflective optical element 4.

Figure 9:
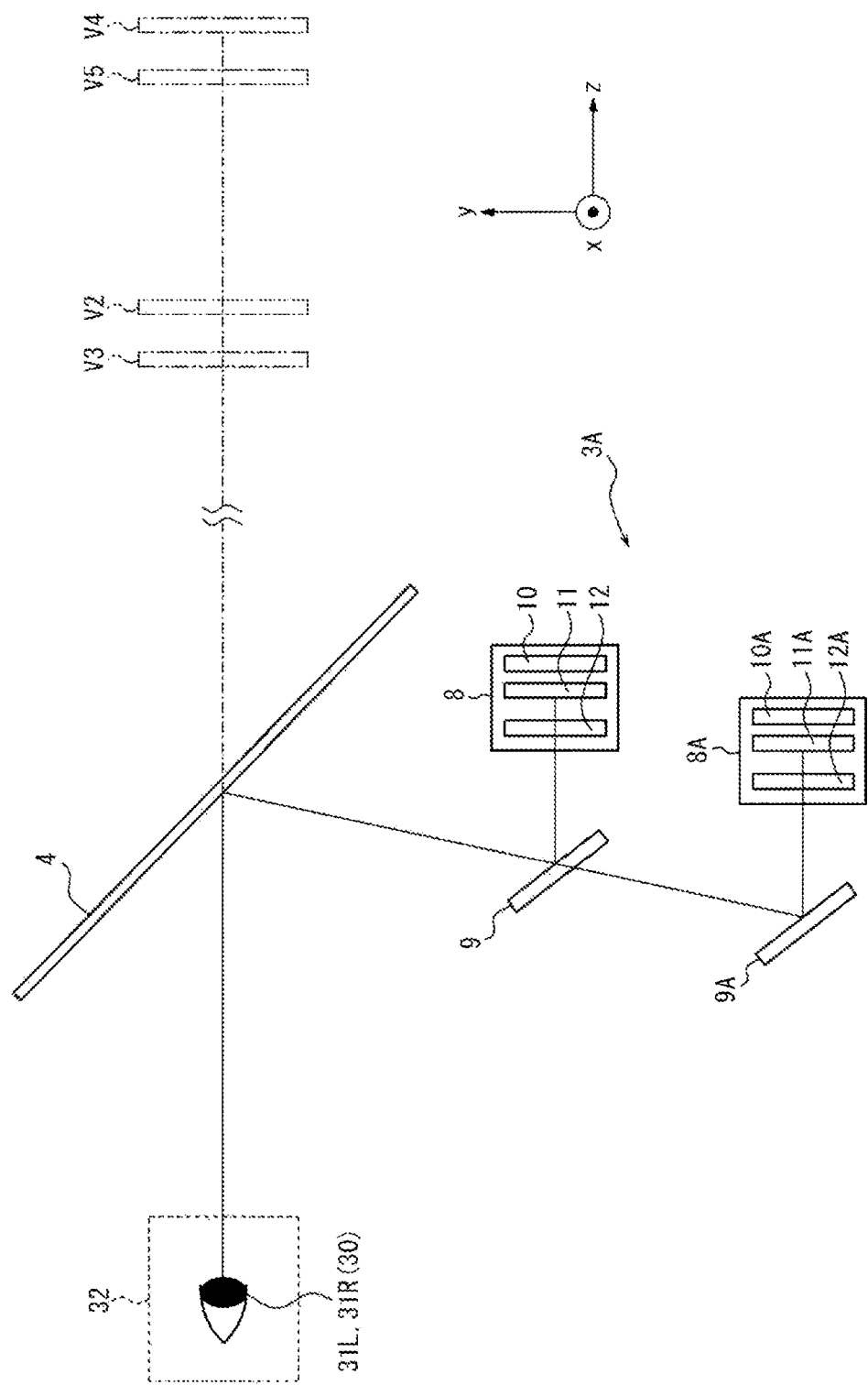
FIG. 9 is a schematic diagram of an example second projection module including two display devices.

In one of multiple embodiments of the present disclosure, the second projection module 3 may be replaced by a second projection module 3A including two display devices 8 and 8A shown in FIG. 9. FIG. 9 shows some components in the second projection module 3A. The display device 8A projects, onto the first reflective optical element 4, an image on which an optical path for the image light is superimposed, as modified from the display device 8 in the second projection module 3 shown in FIG. 1. The optical system 9 may include an optical element that can combine light beams, such as a half-silvered mirror. The display device 8A has the structure similar to the structure of the display device 8. The display device 8A includes an illuminator 10A, a third display panel 11A to display a third image, and a parallax optical element 12A. The second projection module 3A includes an optical system 9A that causes light from the third image to travel toward the first reflective optical element 4. Through the optical systems 9 and 9A, the image light emitted from the second display panel 11 and the third display panel 11A is projected onto the first reflective optical element 4 with the optical paths being superimposed.

In the same manner as described for an image displayed on the display device 8, the left eye 31l and the right eye 31r of the user 30 can view, as a virtual image of the third image appearing on the third display panel 11A, a fourth virtual image V4 frontward from the first reflective optical element 4. The user 30 perceives the third image including a fifth virtual image V5 that is a virtual image of the parallax optical element 12A appearing to define the direction of image light from the fourth virtual image V4. The user 30 can thus view the third image as a stereoscopic image. The HUD system 1 allows the fourth virtual image V4 of the third image to appear farther than the second virtual image V2 of the second image for the user 30 by adjusting the optical system 9 and the optical system 9A.

The HUD system 1 including the second projection module 3A shown in FIG. 9 can thus display the third image at a different distance but in the same direction as the second image. For example, the HUD system 1 can have the first virtual image V1 of the first image, the second virtual image V2 of the second image, and the fourth virtual image V4 of the third image at different distances to display these images at three different levels, or specifically, as a short-distance image, a medium-distance image, and a long-distance image.

The HUD system 1 may include a glass cover 18 for protecting the first projection module 2 and the second projection module 3 between the first reflective optical element 4 and the first and second projection modules 2 and 3. The glass cover 18 may be a flat glass plate or a curved glass plate. The first projection module 2 and the second projection module 3 may have their optical paths for image light from the first image and the second image at least partially overlapping the glass cover 18. The glass cover 18 with this structure can be small. The entire HUD system 1 with this structure can also be small.

First Reflective Optical Element

The first reflective optical element 4 reflects at least a part of the first image and the second image. The first reflective optical element 4 reflects, toward the viewing zone 32 of the user 30, image light from the first image emitted from the first projection module 2 and image light from the second image emitted from the second projection module 3. The HUD system 1 mounted on the movable body 20 being a vehicle may use a windshield of the vehicle as the first reflective optical element 4.

Figure 10:
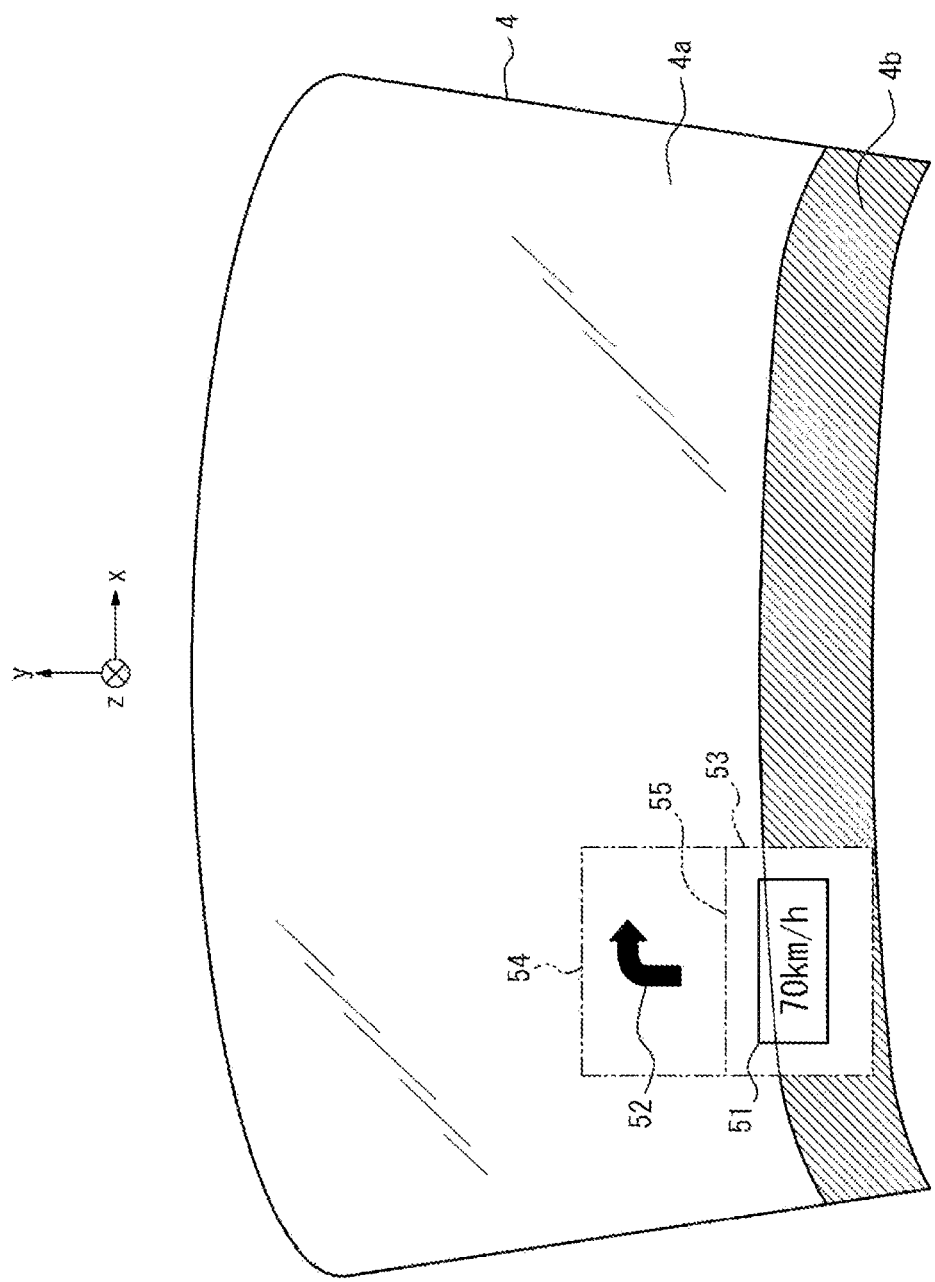
FIG. 10 is a diagram of an example display performed by a HUD in FIG. 1.

With the first projection module 2 and the second projection module 3 in operation, the first reflective optical element 4 can cause a first image 51 and a second image 52 to appear in the field of view of the user 30 as shown in FIG. 10. The first image 51 appears on a first image display area 53. The first image display area 53 is an area on the first reflective optical element 4 onto which an image displayed on the first display panel 6 can be projected. The second image 52 appears in a second image display area 54. The second image display area 54 is an area on the first reflective optical element 4 onto which an image displayed on the second display panel 11 can be projected. The first image display area 53 and the second image display area 54 may be adjacent to each other with a boundary 55 between them. The first image display area 53 and the second image display area 54 may be partially superimposed on each other. The first image display area 53 and the second image display area 54 may be apart from each other.

The first projection module 2 may change the position on the first display panel 6 at which the first image is displayed. The second projection module 3 may change the position on the second display panel 11 at which the second image is displayed. Changing the position at which the first image is displayed on the first display panel 6 changes the display position of the first image 51 in the first image display area 53. Changing the position at which the second image is displayed on the second display panel 11 changes the display position of the second image 52 in the second image display area 54.

As shown in FIG. 10, the first reflective optical element 4 may include a first reflective area 4a that reflects a part of incident light and transmits another part of the incident light. The first projection module 2 may project at least a part of the first image 51 onto the first reflective area 4a. The second projection module 3 may project the entire second image onto the first reflective area 4a. This allows the portion of the first image 51 in the first reflective area 4a and the second image to appear in the field of view of the user 30 in a manner superimposed on the background opposite to the user 30 from the first reflective optical element 4.

The first reflective optical element 4 may include a second reflective area 4b that reflects a part of incident light and substantially blocks another part of the incident light. This allows the first image and the second image projected onto the second reflective area 4b to appear clearly in the field of view of the user 30 without being superimposed on the background opposite to the user 30 from the first reflective optical element 4. For example, the first projection module 2 may project a part of the first image 51 onto the second reflective area 4b. This allows the first image 51 to show information independent of information about the background.

In the HUD system 1 mounted on the movable body 20 being a vehicle, the windshield may include a lower black portion as the second reflective area 4b. The lower black portion of the windshield may be referred to as a black ceramic portion. The second reflective area 4b in the movable body 20 may be usable for displaying information from measuring instruments such as a speedometer, a tachometer, or a direction indicator, which may be located on an instrument panel in a known movable body.

The first projection module 2 including the stage 7 can change the position at which the first image 51 is projected between when the first projection module 2 is in a first projection pose to project the first image 51 onto the first reflective area 4a and when the first projection module 2 is in a second projection pose to project at least a part of the first image 51 onto the second reflective area 4b. The position or the orientation of the first display panel 6 varies between the first projection pose and the second projection pose.

Controller

The controller 5 is connected to each of the components of the HUD system 1 to control these components. The controller 5 may be, for example, a processor. The controller 5 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 5 may be either a system on a chip (SoC) or a system in a package (SiP) in which one or more processors cooperate with other components.

The controller 5 includes a memory. The memory includes any storage device such as a random-access memory (RAM) or a read-only memory (ROM). The memory may store any programs and information for various processes. For example, the memory may store, as the first image and the second image, display items to be displayed. Examples of display items include text, graphics, and animations combining text and graphics.

In the HUD system 1 shown in FIG. 1, the controller 5 is separate from the first projection module 2 and the second projection module 3. Instead of this structure, the functions of the controller 5 may be distributed in the first projection module 2 and the second projection module 3. The controller 5 for the first projection module 2 and the controller 5 for the second projection module 3 may cooperate with each other. In this case, the functions of the controller 5 may be included in the first projection module 2 and the second projection module 3. The HUD system 1 thus includes the first projection module 2, the second projection module 3, and the first reflective optical element 4.

The HUD system 1 according to one or more embodiments of the present disclosure has the structure described above and can display images in a wider range in the field of view of the user 30 than when a single projection module is used. The HUD system 1 can display multiple images at different distances as viewed from the user 30. The HUD system 1 can display a short-distance image in the first image display area 53 at a lower position and thus can display an image of, for example, an instrument that has a higher level of priority. The HUD system 1 can display a long-distance image in the second image display area 54 at an upper position in a manner easily viewable as being superimposed on the background at a long distance. The HUD system 1 projects a parallax image for the left eye 31*l* and the right eye 31*r* of the user 30 as the second image to display a 3D image to be viewable as a stereoscopic image for the user 30. The second projection module 3 can display a 2D image on the second display panel 11 and cause the parallax optical element 12 to be entirely in a light transmission state to project the 2D image in the field of view of the user 30. In other words, the second projection module 3 can switch between displaying a 3D image and displaying a 2D image. The HUD system 1 can thus display a 3D image or a 2D image as appropriate for the situation.

Display Characteristics of First Image and Second Image

In the HUD system 1, the first image 51 is at least partially displayed in the second reflective area 4*b*. The second reflective area 4*b* displays an image with high reflectance and high luminance. Thus, the first image 51 can be displayed as a detailed image with a large volume of information. The second image 52 is superimposed on the distant background and thus appears as a brighter image. The HUD system 1 according to one embodiment may include the first projection module 2 that projects the first image 51 with a color reproduction area larger than the color reproduction area of the second image 52 projected by the second projection module 3.

Figure 11:
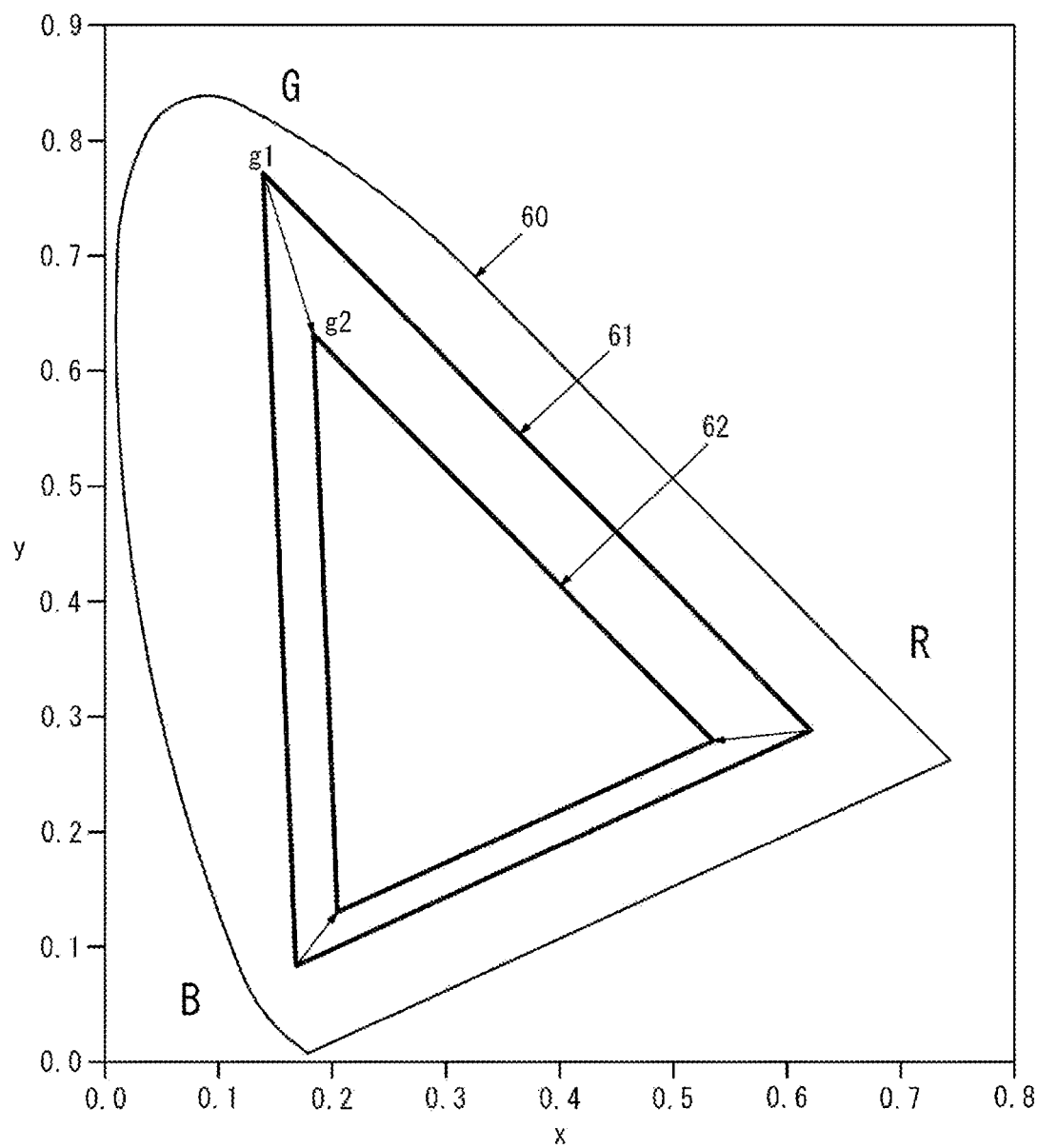
FIG. 11 is a diagram showing the color reproduction areas of a first projection module and the second projection module.

As shown in the chromaticity diagram in FIG. 11, a color space 60 includes, for the first image 51 displayed by the first projection module 2, a first color reproduction area 61 that is wider than a second color reproduction area 62 for the second image 52 displayed by the second projection module 3. The first image 51 can reproduce more colors than the second image 52. The range of colors that are displayable for the first image 51 and that for the second image 52 are determined by the characteristics of the first display panel 6 and the second display panel 11. For example, a green area g1 displayable by green subpixels in the first display panel 6 can be colored with less red and blue components than a green area g2 displayable by green subpixels in the second display panel 11. The same applies to areas displayable by red and blue subpixels.

Similarly to the above color reproduction, the HUD system 1 may include the first projection module 2 that projects the first image 51 with a resolution higher than the resolution of the second image 52 projected by the second projection module 3. This allows the first image 51 viewable nearer the user 30 to display a higher definition image.

Cooperative Display of First Image and Second Image

The controller 5 controls the first projection module 2 and the second projection module 3 to cooperate with each other to project an image onto the first reflective optical element 4.

Figure 12:
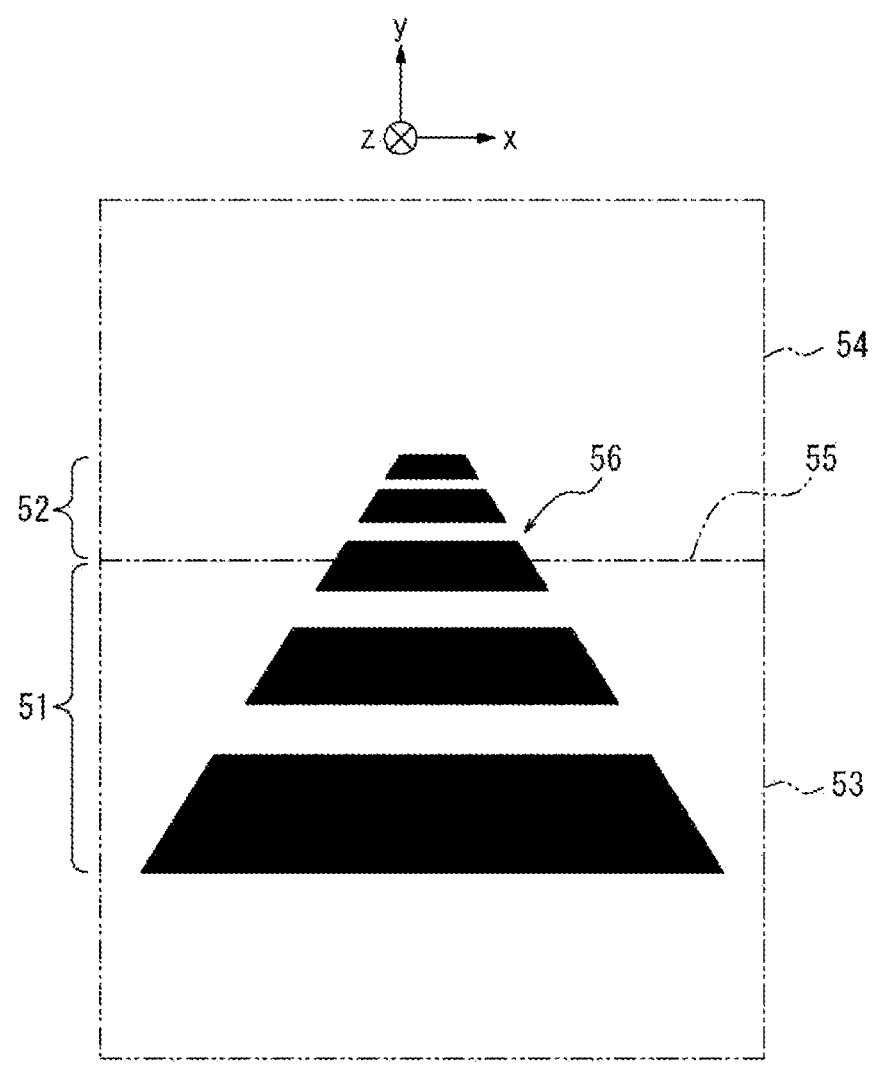
FIG. 12 is a diagram of another example display performed by the HUD in FIG. 1.

As shown in FIG. 12, for example, the controller 5 allows a display item 56 to appear across the boundary 55 between the first image display area 53 onto which the first image 51 is to be projected and the second image display area 54 onto which the second image 52 is to be projected. The display item 56 includes a portion of the first image 51 and a portion of the second image 52. The display item 56 is one of target items to be displayed by the HUD system 1 as controlled by the controller 5. Examples of the display item 56 include an image of a speedometer, an image of an arrow indicating the traveling direction, and a message and an animated image to alert the user 30.

For example, the controller 5 may allow the display item 56 to appear as moving across the boundary 55 between the first image display area 53 onto which the first image 51 is to be projected and the second image display area 54 onto which the second image 52 is to be projected. For example, the controller 5 may display an animated image moving across the boundary 55 in cooperation with the first image 51 and the second image 52. For example, a striped image shown in FIG. 12 may appear moving from the front toward the back across the boundary 55.

To cause the first projection module 2 and the second projection module 3 to operate in cooperation with each other, the controller 5 controls the first projection module 2 and the second projection module 3 to display the first image 51 and the second image 52 in a manner to appear naturally as connecting to each other at the boundary 55.

For the first image 51 having a wider color reproduction area than the second image 52, the controller 5 may adjust the color reproduction area of the first image 51 to match the color reproduction area of the second image 52. As in the chromaticity diagram shown in FIG. 11 including the first color reproduction area 61 for the first projection module 2 wider than the second color reproduction area 62 for the second projection module 3, the first projection module 2 renders the colors of the first image 51 within the second color reproduction area 62. The HUD system 1 can thus display the display item 56 appearing naturally for the user 30 with no difference in color display across the boundary 55 between the first image 51 and the second image 52.

For the first image 51 having a higher resolution than the second image 52, the controller 5 may adjust the resolution of the first image 51 to match the resolution of the second image 52. The HUD system 1 can thus display the display item 56 appearing naturally for the user 30 with no difference in resolution across the boundary 55 between the first image 51 and the second image 52.

The controller 5 can display the display item 56 based on the position and the orientation of each of the first display panel 6 and the second display panel 11 and the positioning of the optical system 9. The controller 5 may adjust images displayed on the first display panel 6 and the second display panel 11 to display the first image 51 on the first display panel 6 and the second image 52 on the second display panel 11 with no distortion as viewed by the user 30.

Processing in Error

The controller 5 may perform an error mode process upon detecting an error state of either the first display panel 6 or the second display panel 11 that cannot display images. An example process from combining multiple display items to performing the processing in response to an error state of the first display panel 6 will now be described below with reference to the flowchart in FIG. 13.

The controller 5 generates the first image 51 and the second image 52 by combining multiple display items 56 to be displayed using the HUD system 1 (step S01). For example, the controller 5 in the HUD system 1 mounted on the movable body 20 can combine display items 56 that are an image of a speedometer and an image indicating the shift position as the first image to appear on the first display panel 6. The controller 5 can combine an image of an arrow indicating the traveling route and an image indicating the distance to a vehicle ahead as display items 56 into the second image to be displayed on the second display panel 11.

The controller 5 adds an error detection signal to image signals for the first image and the second image generated in step S01 to detect an error (step S02). A signal for detecting an error may be, for example, a cyclic redundancy check (CRC) code for detecting CRC errors.

The controller 5 transmits information about the first image with an error detection signal to the first display panel 6 and information about the second image with an error detection signal to the second display panel 11 (step S03). The first display panel 6 receives the first image from the controller 5 (step S04). The second display panel 11 receives the second image from the controller 5.

Figure 13:
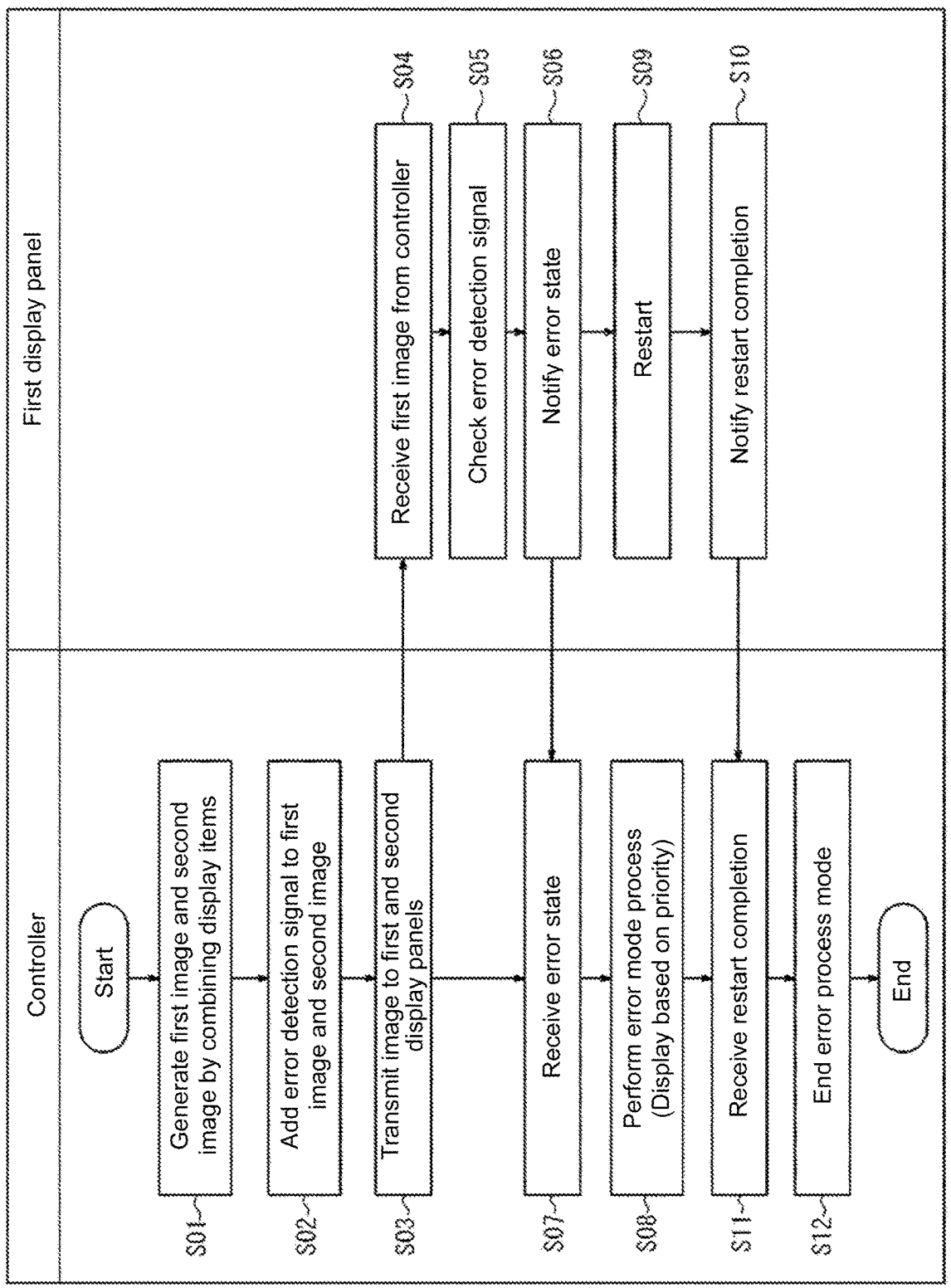
FIG. 13 is a flowchart of an example process in response to an error in an image display.

The first display panel 6 displays an image based on the received first image and checks the error detection signal to detect any error in the displayed image (step S05). In the flowchart of FIG. 13, an error is detected on the first display panel 6.

The first display panel 6 notifies the controller 5 of the error (step S06). The controller 5 receives the notification of the error (step S07).

Once being notified of the error state of the first display panel 6, the controller 5 performs an error mode process (step S08). In the error mode process, the controller 5 displays, on the displayable second display panel 11 with no error, display items 56 in the order of priority of the display items 56. When all the display items 56 cannot be displayed on the second display panel 11, the controller 5 may display one or more display items 56 with a higher level of priority on the second display panel 11.

After the first display panel 6 notifies the controller 5 of the error state, a restart process is performed (step S09). Once the restart process is complete, the first display panel 6 notifies the controller 5 of completion of the restart process (step S10).

Upon receiving the notification that the restart process is complete from the first display panel 6 (step S11), the controller 5 ends the error mode process (step S12). The controller 5 then resumes the image display using the first projection module 2 and the second projection module 3.

The HUD system 1 can continue to display, after an error occurs on the first display panel 6 or on the second display panel 11, display items 56 with high levels of priority.

Although the above embodiments are described as typical examples, various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments or examples may be combined into a structural block, or each structural block may be divided. The embodiments of the present disclosure can also be implemented as a method or a program implementable by a processor included in the device, or as a storage medium storing the program. These method, program, and storage medium also fall within the scope of the present disclosure.

Figure 14:
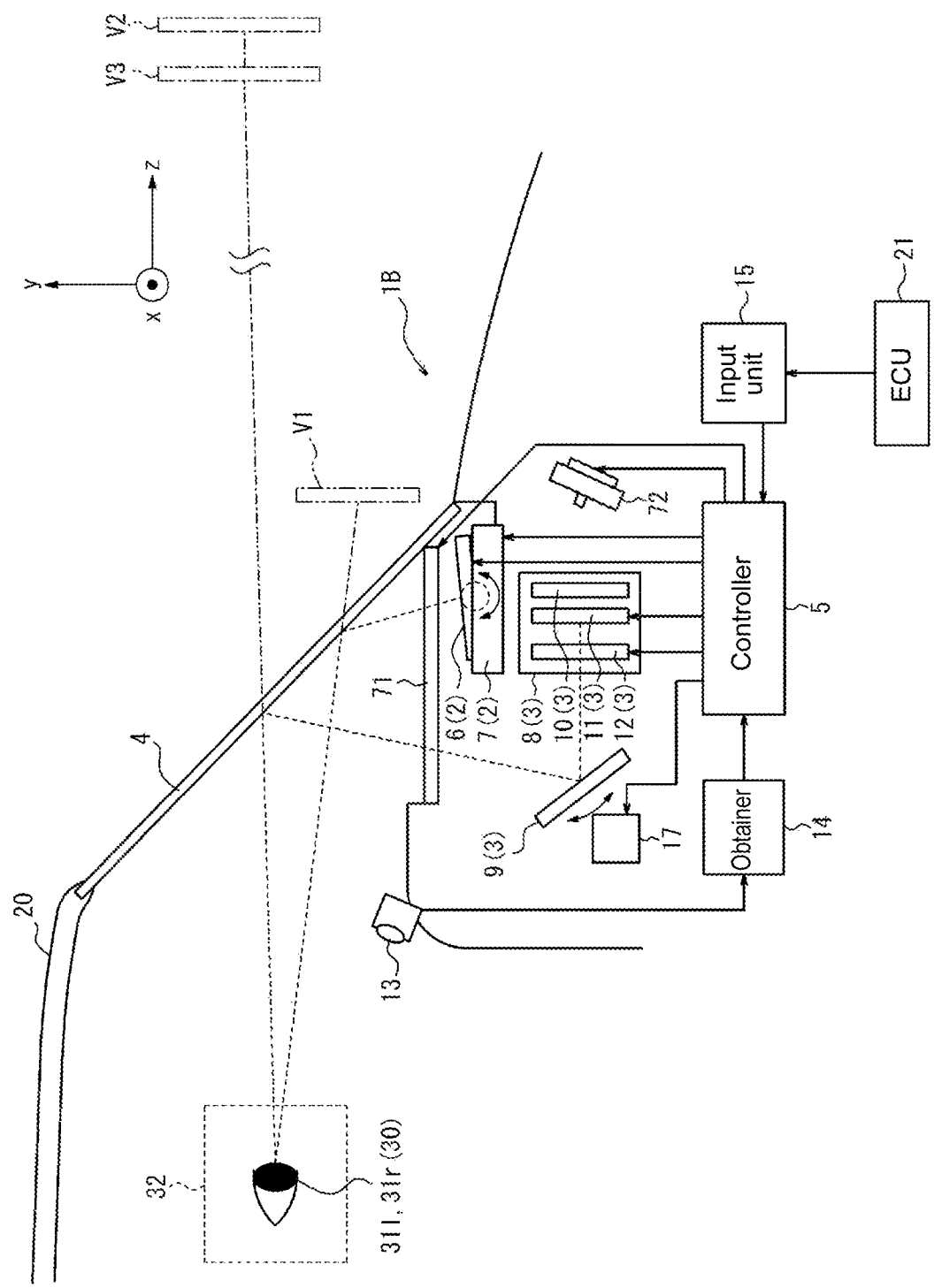
FIG. 14 is a schematic diagram of a still another example HUD system mounted on a movable body.

As shown in FIG. 14, for example, a HUD system 1B according to one of multiple embodiments may include an optical member 71 with light-shielding capability between a first reflective optical element 4 and first and second projection modules 2 and 3 and, instead of the glass cover 18.

The optical member 71 may include, for example, a blind including polymer-dispersed liquid crystals (PDLCs). The controller 5 can control the light transmittance of the optical member 71. The optical member 71 may switch between the light-shielding state and the transparent state. The controller 5 may control the optical member 71 to be in the light-shielding state when, for example, the HUD system 1B receives no power. The controller 5 may control the optical member 71 to be in the transparent state when the HUD system 1B receives power. As described above, the HUD system 1B not in use can reduce entry of external light into the first projection module 2 and the second projection module 3 and thus reduce damage to optical elements including the first display panel 6 and the second display panel 11.

As shown in FIG. 14, the HUD system 1B may further include a cooler 72 that cools both or either of the first projection module 2 and the second projection module 3. The cooler 72 may be provided specifically to cool the first display panel 6 and the second display panel 11. The cooler 72 may include a water-cooling cooler or an air-cooling cooler. The cooler 72 may use a force of wind from an air-conditioner installed in the movable body 20 to cool the first display panel 6 and the second display panel 11. The cooler 72 may be controlled on and off by the controller 5. The controller 5 activates the cooler 72 in response to, for example, the HUD system 1B receiving power. The HUD system 1B may further include a temperature sensor for measuring the temperature inside the HUD system 1B. The controller 5 may control the operational state of the cooler 72 based on the temperature measured with the temperature sensor.

The other components of the HUD system 1B may be the same as in the HUD system 1 in FIG. 1. Thus, the HUD system 1B has the same advantages as the HUD system 1.

In one or more embodiments of the present disclosure, the second projection module includes a liquid crystal shutter as a parallax optical element. The parallax optical element is not limited to a liquid crystal shutter but may be another optical element that can substantially define the viewing zone for the parallax image. For example, the parallax optical element may be a parallax barrier plate with slits that are arranged parallel to one another. The slits allow transmission of the right eye image in the parallax image along the optical path toward the right eye and the left eye image toward the left eye. For the parallax optical element being the parallax barrier with fixed openings as described above, the controller may switch, based on the movement of the head of the user, between subpixels displaying the left eye image and subpixels displaying the right eye image on the second display panel. In this manner, the controller can continue displaying a 3D image for the user independently of any displacements of the eyes of the user.

The parallax optical element may be an optical component including multiple lenticular lenses arranged parallel to one another into a flat surface. The lenticular lenses can deflect the left eye image and the right eye image in the parallax image alternately displayed on the second display panel respectively to the optical path toward the right eye and the optical path toward the left eye.

The present disclosure may be implemented in the following forms.

A head-up display system according to one embodiment of the present disclosure includes a first projection module, a second projection module, and a first reflective optical element. The first projection module projects a first image. The second projection module projects a second image. The first reflective optical element reflects at least a part of the first image and at least a part of the second image. The first projection module includes a first display panel that displays the first image and projects the first image toward the first reflective optical element. The second projection module includes a second display panel that displays the second image, and an optical system that directs the second image toward the first reflective optical element.

A movable body according to one embodiment of the present disclosure includes a head-up display system. The head-up display system includes a first projection module, a second projection module, and a first reflective optical element. The first projection module projects a first image. The second projection module projects a second image. The first reflective optical element reflects at least a part of the first image and at least a part of the second image. The first projection module includes a first display panel that displays the first image and projects the first image toward the first reflective optical element. The second projection module includes a second display panel that displays the second image, and an optical system that directs the second image toward the first reflective optical element.

The head-up display system and the movable body according to one or more embodiments of the present disclosure has an extended range for displaying an image in the field of view of the user.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST 1, 1A, 1B head-up display system (HUD system)
2, 2A first projection module
3, 3A second projection module
4 first reflective optical element
4a first reflective area
4b second reflective area
5 controller
6 first display panel
7 stage
8, 8A display device
9, 9A optical system
10, 10A illuminator
11 second display panel
11A third display panel
12, 12A parallax optical element
13 detector
14 obtainer
15 input unit
17 drive
18 glass cover
20 movable body
21 electronic control unit (ECU)
30 user
31l left eye
31r right eye
32 viewing zone
41 first display panel
42 second reflective optical element
43 mirror drive
51 first image
52 second image
53 first image display area
54 second image display area
55 boundary
56 display item
60 color space
61 first color reproduction area
62 second color reproduction area
71 optical member
72 cooler
A active area
P pixel
Pg subpixel group
V1 first virtual image
V2 second virtual image
V3 third virtual image
V4 fourth virtual image
V5 fifth virtual image
VaL left viewable area
VbL left light-reducing area
VaR right viewable area
VbR right light-reducing area

The invention claimed is:

1. A head-up display system, comprising:
a first projection module configured to project a first image;
a second projection module configured to project a second image; and
a first reflective optical element configured to reflect at least a part of the first image and at least a part of the second image, wherein
the first projection module includes
a first display panel configured to display the first image, to project the first image linearly onto the first reflective optical element, and change a position at which the first image is projected onto the first reflective optical element, and
the second projection module includes
a second display panel configured to display the second image, and an optical system configured to direct the second image toward the first reflective optical element.

2. The head-up display system according to claim 1, wherein
the second display panel displays a parallax image as the second image, and the second projection module further includes a parallax optical element configured to substantially define a viewing zone for the parallax image.

3. The head-up display system according to claim 2, wherein
the parallax optical element is switchable between a first state of defining a traveling direction of image light from the second image and a second state of evenly transmitting the second image, and the second display panel displays, in synchronization with switching of the parallax optical element, an image that is switchable between the parallax image and a two-dimensional image.

4. The head-up display system according to claim 1, wherein
the first projection module includes a stage configured to move the first display panel to a different position or to have a different orientation relative to the first reflective optical element.

5. The head-up display system according to claim 1, wherein
the first projection module includes a second reflective optical element configured to change a position at which the first image is projected onto the first reflective optical element.

6. The head-up display system according to claim 1, wherein
the first projection module changes a position of the first image on the first display panel.

7. The head-up display system according to claim 1, wherein
the first reflective optical element includes a first reflective area to reflect a part of incident light and to transmit another part of the incident light, the first projection module projects at least a part of the first image onto the first reflective area, and the second projection module projects an entire part of the second image onto the first reflective area.

8. The head-up display system according to claim 7, wherein
the first reflective optical element includes a second reflective area to reflect the part of incident light and substantially block the another part of the incident light.

9. The head-up display system according to claim 8, wherein
the first projection module projects a part of the first image onto the second reflective area.

10. The head-up display system according to claim 9, wherein
the first projection module changes a position at which the first image is projected between when the first projection module is in a first projection pose to project the first image onto the first reflective area and when the first projection module is in a second projection pose to project the part of the first image onto the second reflective area.

11. The head-up display system according to claim 1, wherein
the second projection module further includes a third display panel configured to display a third image, and the optical system directs the third image toward the first reflective optical element.

12. The head-up display system according to claim 1, wherein
the first image projected by the first projection module has a color reproduction area wider than a color reproduction area of the second image projected by the second projection module.

13. The head-up display system according to claim 1, wherein
the first image projected by the first projection module has a resolution higher than a resolution of the second image projected by the second projection module.

14. The head-up display system according to claim 1, further comprising:
a controller configured to control the first projection module and the second projection module, the controller being configured to cause a display item to appear across a boundary between a first image display area and a second image display area, the first image display area being an area in which the first image is projected by the first projection module, the second image display area being an area in which the second image is projected by the second projection module.

15. The head-up display system according to claim 1, further comprising:
a controller configured to control the first projection module and the second projection module, the controller being configured to cause a display item to appear as moving across a boundary between a first image display area and a second image display area, the first image display area being an area in which the first image is projected by the first projection module, the second image display area being an area in which the second image is projected by the second projection module.

16. The head-up display system according to claim 14, wherein
a color reproduction area of the first image projected by the first projection module is wider than a color reproduction area of the second image projected by the second projection module, and the controller adjusts the color reproduction area of the first image to match the color reproduction area of the second image.

17. The head-up display system according to claim 14, wherein
a resolution of the first image projected by the first projection module is higher than a resolution of the second image projected by the second projection module, and the controller adjusts the resolution of the first image to match the resolution of the second image area.

18. The head-up display system according to claim 14, wherein
the controller adjusts luminance of the first image to match luminance of the second image.

19. The head-up display system according to claim 14, wherein
the controller displays the display item based on a position and an orientation of the first display panel and a position and an orientation of the second display panel.

20. The head-up display system according to claim 1, further comprising:
a controller configured to control the first projection module and the second projection module, the controller being configured to perform an error mode process of displaying, in response to an error state of the first display panel or the second display panel being disabled from displaying an image, a display item of a plurality of display items to be displayed on a displayable panel of the first display panel or a displayable panel of the second display panel, in accordance with a priority level of each display item of the plurality of display items.

21. The head-up display system according to claim 20, wherein
the controller adds an error detection signal to a first image signal representing the first image and a second image signal representing the second image, and transmits the first image signal to the first display panel and the second image signal to the second display panel, and upon detecting the error state based on the error detection signal, the first display panel or the second display panel notifies the error state to the controller.

22. The head-up display system according to claim 21, wherein
the first display panel or the second display panel detecting the error state performs a restart process and notifies the controller of a completion of the restart process, and the controller ends an error mode process of the first display panel or the second display panel upon receiving notification of the completion of the restart process.

23. The head-up display system according to claim 1, further comprising:
an optical member between the first reflective optical element and the first projection module and the second projection module, the optical member having light-shielding capability.

24. The head-up display system according to claim 1, further comprising:
a cooler to cool the first projection module and the second projection module.

25. A movable body, comprising:
a head-up display system including
a first projection module configured to project a first image,
a second projection module configured to project a second image, and
a first reflective optical element configured to reflect at least a part of the first image and a part of the second image, wherein
the first projection module includes
a first display panel configured to display the first image, to project the first image linearly onto the first reflective optical element, and change a position at which the first image is projected onto the first reflective optical element, and
the second projection module includes a second display panel configured to display the second image, and an optical system configured to direct the second image toward the first reflective optical element.

\* \* \* \* \*